United States Patent [19]
Elko et al.

[11] Patent Number: 5,317,739
[45] Date of Patent: May 31, 1994

[54] METHOD AND APPARATUS FOR COUPLING DATA PROCESSING SYSTEMS

[75] Inventors: David A. Elko, Poughkeepsie; Jeffrey A. Frey, Fishkill; John F. Isenberg, Jr., Poughkeepsie; Jeffery M. Mick, Fishkill, all of N.Y.; Jimmy P. Strickland, Saratoga, Calif.; Michael D. Swanson, Poughkeepsie, N.Y.; Audrey A. Helffrich, Poughkeepsie, N.Y.; Brian B. Moore, Poughkeepsie, N.Y.

[73] Assignee: International Business Machines Corp., Armonk, N.Y.

[21] Appl. No.: 860,803

[22] Filed: Mar. 30, 1992

[51] Int. Cl.⁵ .................. G06F 15/16; G06F 13/00
[52] U.S. Cl. .................. 395/650; 364/228.3; 364/228.1; 364/229; 364/230; 364/228.8; 364/281.3; 364/281.7; 364/284; 364/284.3; 364/284.1; 364/DIG. 1
[58] Field of Search ............... 395/200, 325, 650, 800, 395/275, 725; 371/11.3; 340/825.52, 825.5

[56] References Cited

U.S. PATENT DOCUMENTS

| | | | |
|---|---|---|---|
| 4,543,627 | 9/1985 | Schwab | 364/200 |
| 4,709,325 | 11/1987 | Yajima | 364/200 |
| 4,718,002 | 1/1988 | Carr | 364/200 |
| 4,777,595 | 10/1988 | Strecker et al. | 364/200 |
| 4,866,606 | 9/1989 | Kopetz | 364/200 |
| 4,965,719 | 10/1990 | Shoens et al. | 364/200 |
| 5,056,000 | 10/1991 | Chang | 364/200 |
| 5,084,816 | 1/1992 | Boise et al. | 395/575 |
| 5,142,683 | 8/1992 | Burkhardt, Jr. et al. | 395/725 |

Primary Examiner—Gopal C. Ray
Attorney, Agent, or Firm—William B. Porter

[57] ABSTRACT

A Structured External Storage (SES) device/processor is connected to two or more DP systems, thereby loosely coupling the systems. The SES is capable of holding data objects of two distinct types (List objects and Cache objects), and communicates commands and command responses with the systems using a message protocol. A support facility within a processor on which a system is executing receives status indications from the SES without interrupting mainline system execution. Within the SES, a serialization mechanism allows more than one command to execute in parallel without loss of data object integrity, or command consistency. A forward completion mechanism sends to systems early notification of completion of certain commands, without permitting results inconsistent with this notification to be obtained by the systems. And a restart mechanism permits interrupted commands to be restarted by the initiating system or, in certain cases, by another system.

24 Claims, 16 Drawing Sheets

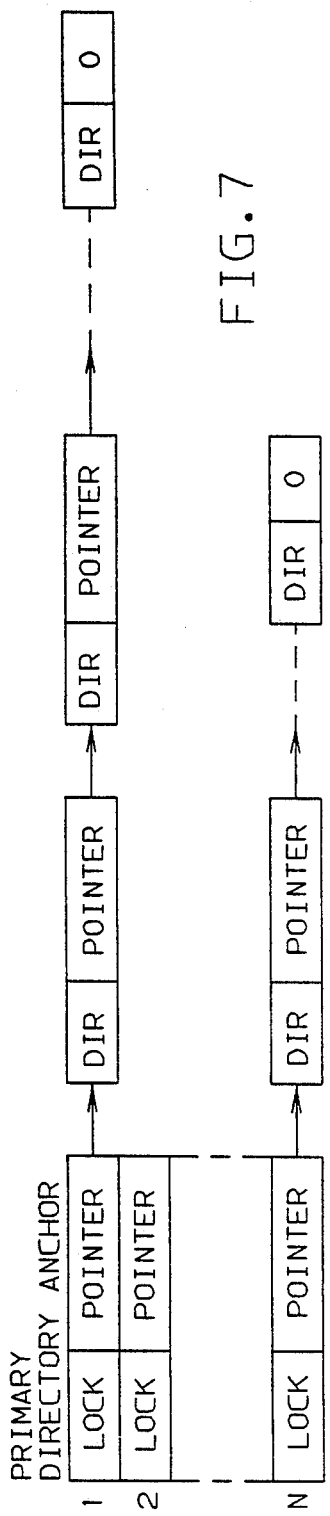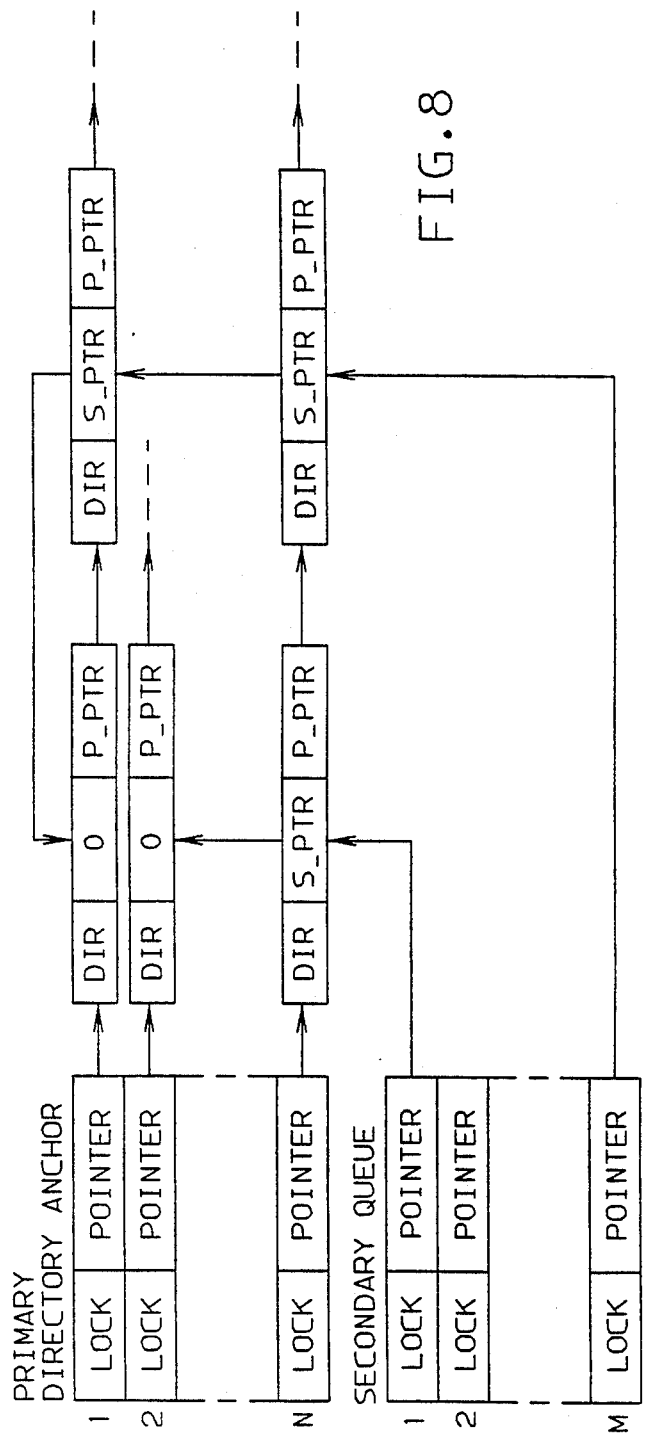
FIG.7
FIG.8

FIG.9
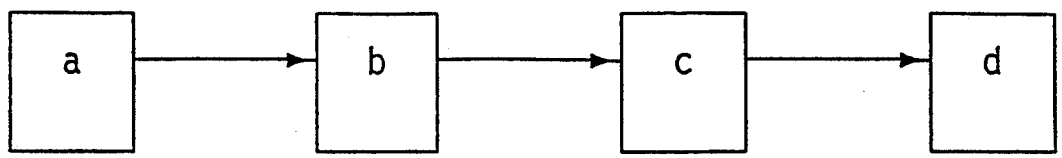
STORAGE CLASS QUEUE BEFORE REFERENCE
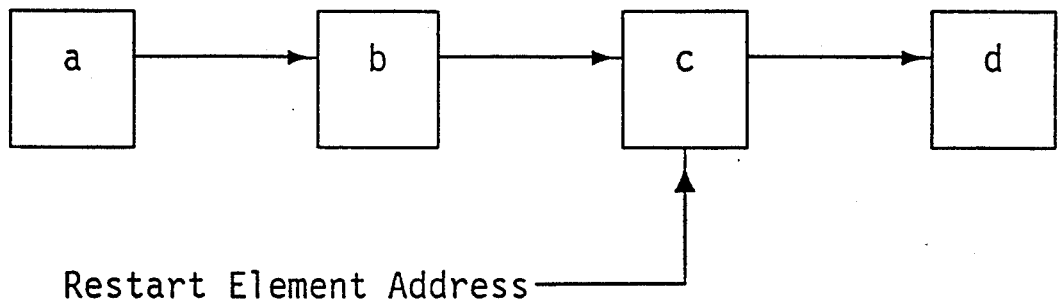
Restart Element Address
STORAGE CLASS QUEUE AFTER COMMAND TIME-OUT
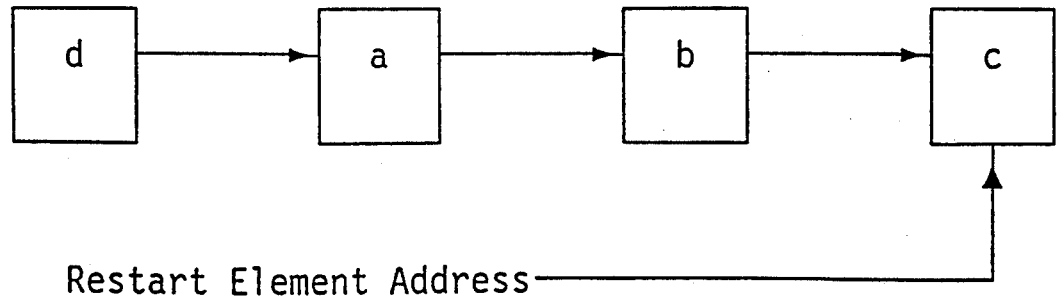
Restart Element Address
STORAGE CLASS QUEUE AFTER REFERENCE TO ELEMENT D

METHOD AND APPARATUS FOR COUPLING DATA PROCESSING SYSTEMS

CROSS REFERENCE TO RELATED APPLICATIONS

This application contains subject matter which is related to the subject matter of the following applications which are assigned to the same assignee as this application. They are hereby incorporated by reference: "Configurable, Recoverable Parallel Bus" by N. G. Bartow et al, Ser. No. 07/839,657, Filed: Feb. 20, 192; "High Performance Intersystem Communications For Data Processing Systems" by N. G. Bartow et al, Ser. No. 07/839,652, Filed: Feb. 20, 192; and "Frame-Group Transmission And Reception For Parallel/Serial Buses", Ser. No. 07/839,986, Filed: Feb. 20, 1992.

The subject matter in the following listed applications is related to and is hereby incorporated by reference in the present application. Each of the following listed applications is owned by the same assignee as the present application, is filed on the same day as the present application, and has the same priority date as the present application. They are: "Communicating Messages Between Processors And A Coupling Facility" by D. A. Elko et al, Ser. No. 07/860,380; "Sysplex Shared Data Coherency Method and Means" by D. A. Elko et al, Ser. No. 07/860,805; "Method and Apparatus For Distributed Locking of Shared Data, Employing A Central Coupling Facility" by D. A. Elko, et al., Ser. No. 07/860,808; "Command Quiesce Function" by D. A. Elko et al, Ser. No. 07/860,330; "Storage Management For A Shared Electronic Storage, Cache" by D. A. Elko et al, Ser. No. 07/860,807; "Management Of Data Movement From A SES Cache To DASD" by D. A. Elko et al, Ser. No. 07/860,806; "Command Retry System" by D. A. Elko et al, Ser. No. 07/860,378; "Integrity Of Data Objects Used To Maintain State Information For Shared Data At A Local Complex" by D. A. Elko et al, Ser. No. 07/860,800; "Management Of Data Objects Used To Maintain State Information For Shared Data At A Local Complex" by J. A. Frey et al, Ser. No. 07/860,797; "Recovery Of Data Objects Used To Maintain State Information For Shared Data At A Local Complex" by J. A. Frey et al, Ser. No. 07/860,647; "Message Path Mechanism For Managing Connections Between Processors And A Coupling, Facility" by D. A. Elko et al, Ser. No. 07/860,646; "Method And Apparatus For Notification Of State Transitions For Shared Lists of Data Entries" by J. A. Frey, et al., Ser. No. 07/860,809; "Method And Apparatus For Performing Conditional Operations on Externally Shared Data" by J. A. Frey, et al., Ser. No. 07/860,655; "Apparatus And Method For List Management In A Coupled DP System" by J. A. Frey, et al., Ser. No. 07/860,633; and "Interdicting I/O And Messaging Operations In A Multi-System Complex" by D. A. Elko, et al., Ser. No. 07/860,489.

BACKGROUND OF THE INVENTION

This invention relates to the field of coupled data processing systems. More particularly, it relates to data processing systems operating independently but loosely coupled by attachment to a Structured External Storage (SES) processing facility.

Loosely coupled Data Processing systems in the past were often characterized by having more than one operating system (executing on different processors, or on a common partitioned processor) each attached to a shared direct access storage device (DASD) which contained shared data. In such systems the shared DASD functions as a mere repository—with each attached system (or program/process on such a system) manipulating data on the DASD, and other systems later viewing the results of such manipulation. IBM's MVS/SP JES2 provides an illustrative example of such an environment. In such an environment, the shared data repository (shared DASD) is a "passive" element, with the coupling being accomplished by means of protocols jointly agreed to among the systems, such as locking protocols, and, often, by direct communication between the systems.

SUMMARY OF THE INVENTION

The present invention provides a mechanism for coupling systems together through a device termed here a "Structured External Storage" (SES) facility. This facility is a repository for shared data objects (here described as being of one or two of two distinct types: Cache objects and List objects), and has a processing capacity which enables it to independently process commands, or messages, received from the sharing systems through a defined message protocol. In processing these commands the SES may generate messages to the command-sending system, or to other systems. Each of the sharing systems has a SES Support Facility which permits it to receive notifications from the SES without interruption of mainline processing within the processor on which the sharing system is operating.

At the SES, a command serialization mechanism permits the parallel execution of multiple commands, while preserving the integrity of data objects. A "forward completion" mechanism permits command responses to be returned to sharing processors before actual processing completion at the SES, while preventing the observation of incomplete results from the sharing processors after receipt of such early completion responses. And a restart mechanism permits the restart of commands interrupted within the SES, by the initiating system or, for certain commands, by any system.

It is an object of the present invention to provide an improved mechanism for loosely coupling data processing systems.

It is a further object of this invention to provide a systems coupling device capable of independent command execution.

It is further object of this invention to provide a systems coupling device capable of storing and operating on at least two different types of shared data objects in response to commands from the sharing systems.

It is a further object of this invention to provide a support facility at each sharing processor capable of interacting with, and receiving notice from, a shared coupling device containing two distinct data object types.

It is a further object of the present invention to permit early command completion notification, by a shared coupling device, to a sharing DP system, before actual command completion, but without possibility of the sharing system perceiving a subsequent failure to complete the command by the coupling device.

It is a further object of the present invention to provide a mechanism for restart, by a sharing system, of a command whose processing was initiated at a coupling device by the same sharing system.

It is a further object of the present invention to provide a mechanism for restart, by a sharing system, of a command whose processing was initiated at a coupling device by another sharing system.

BRIEF DESCRIPTION OF THE DRAWINGS

These and other objects of the present invention will be apparent from the following more particular description of the preferred embodiment of the invention as illustrated in the drawings.

FIG. 7 is a control block diagram illustrating a directory and queued data entries;

FIG. 8 is a control block diagram illustrating a primary and secondary queue structure;

FIG. 9 is a control block diagram illustrating storage class queues during command restart;

DESCRIPTION OF A PREFERRED EMBODIMENT

Figure 1:
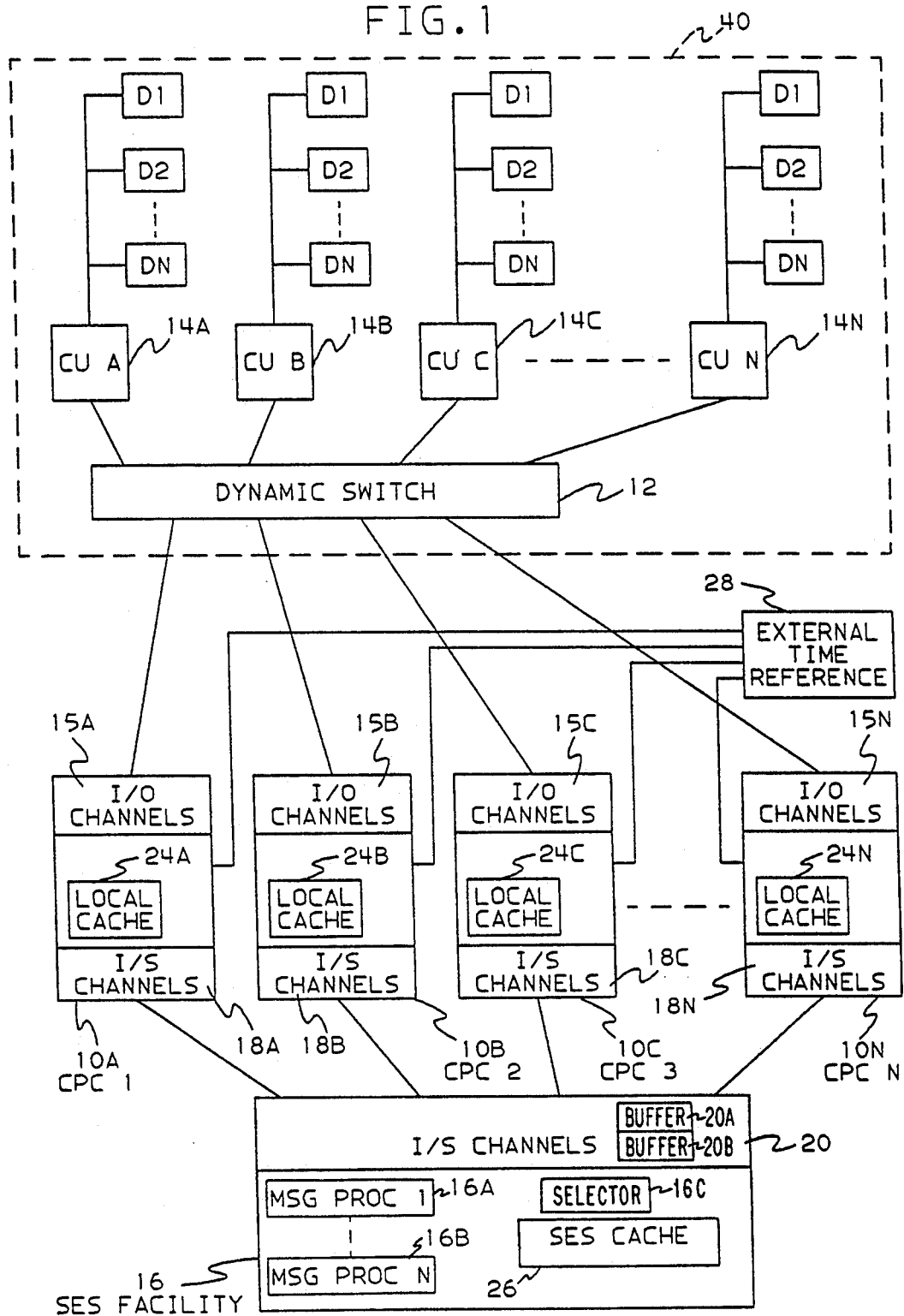
FIG. 1 is a block diagram of a data processing system of the present invention having multiple CPCs connected to an I/O system and a SES facility.

FIG. 1 is a block diagram of a data processing system using the present invention. The system of FIG. 1 includes multiple central processing complexes (CPCs) 10A through 10N which are connected to an input/output (I/O) system including a dynamic switch 12 controlling access to multiple I/O control units 14A through 14N. Each of the control units 14A through 14N controls one or more direct access storage devices (DASD) D1 through DN as shown. The dynamic switch 12 may be an ESCON Director dynamic switch available from IBM Corporation, Armonk, N.Y. Such a dynamic switch is disclosed in U.S. Pat. No. 5,107,489 which issued Apr. 21, 1992, entitled "Switch and Its Protocol for Making Dynamic Connections and assigned to the owner of the present invention, which application is incorporated herein by reference. As is known, I/O commands and data are sent from a CPC to an I/O control unit through the dynamic switch 12 by means of I/O channels 15A through 15N of the respective CPCs 10A through 10N. Channel programs for a particular I/O channel are established by channel command words (CCWs) as is well known in the art.

Each of the CPCs 10A-10N are connected to a structured-external-storage (SES) facility 16, which contains storage accessible by the CPCs and which performs operations requested by programs in the CPCs. Each CPC 10A-10N contains intersystem (I/S) channels 18A-18N, respectively, which are connected to I/S channels 20 in the SES facility 16. The SES facility 16 is also referred to herein as a coupling facility. Even though only one SES facility 16 is shown in the embodiment of FIG. 1, it will be understood that multiple SES facilities may be provided for, each with its own I/S channels and message paths connected to all or some subset for the CPCs 10A-10N. It will be understood that the I/O channels 15 are part of the well known channel subsystem (CSS), which CSS also includes the I/S channels 18 disclosed herein, even though channels 15 and 18 are shown separately in FIG. 1 for convenience.

Each of the CPCs 10A-10N has a local cache 24A-24N, respectively, and the SES facility 16 contains one or more SES caches 26. The DASD devices D (referred to herein collectively as DASD 40), the local caches 24A-24N and the SES cache 26 form a three-level storage hierarchy. The lowest level of storage is the DASD 40, the intermediate level of storage is the SES cache 26, and the highest level is the local caches 24A-24N. The local caches 24A-24N are many times referred to herein as the local cache 24.

Each of the CPCs 10A-10N may be an IBM system following the Enterprise Systems Architecture/390 Principles of Operation as described in IBM publication SA22-7201-00. Each of the CPCs 10A-10N includes one or more central processing units (CPUs) which executes an operating system, such as IBM's MVS operation system, for controlling execution of programs for processing data, as is well known. One such program performs many of the SES operations mentioned herein. This program is referred to herein as "the program." Individual instructions of the program are identified as "CPU instructions."

An external time reference (ETR) 28 provides time stamps of control information to be written into a log to document recovery from failures, backing out of undesired operations, and for audit trails. The ETR 28 synchronizes the time clocks (not shown) of the CPCs 10A-10N to a precision equal to or less than the duration of the shortest externally visible operation, and uses fiber optic interconnect cables. The ETR 28 provides for cable length propagation time differences where those differences are important in order to be able to maintain synchronization to within the length of the mentioned external operation.

Figure 2:
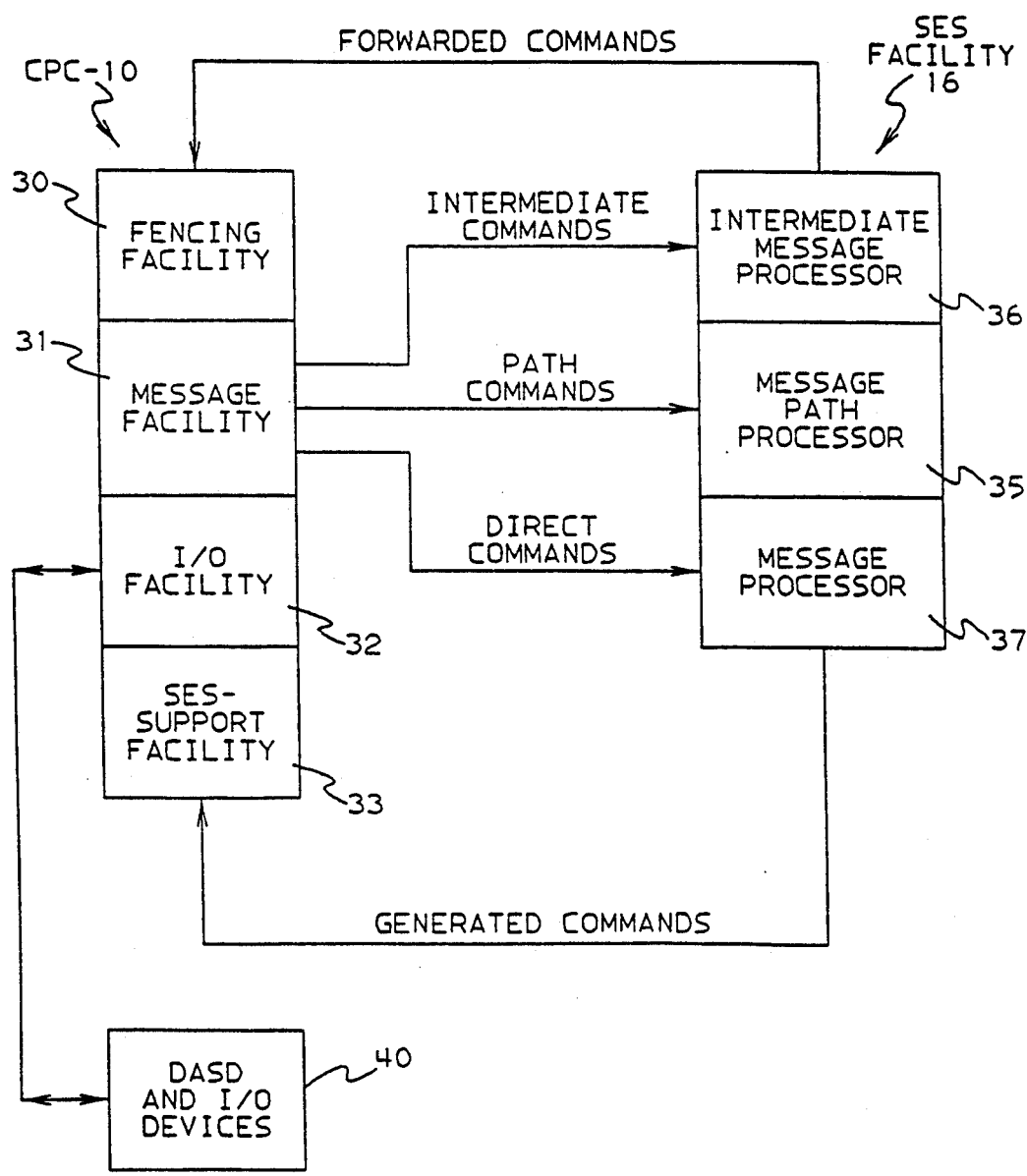
FIG. 2 is a portion of the system of FIG. 1 and several facilities of a single CPC connected to processors of the SES facility.

FIG. 2 shows a single CPC 10 connected to the SES facility 16. The CPC 10 includes a fencing facility 30, a message facility 31, an I/O facility 32 and a SES-support facility 33. The SES facility 16 includes a message-path processor 35, an intermediate-message processor 36, and a message processor 37. The message-path processor 35 executes message-path commands and performs message-path functions. The intermediate-message processor 36 forwards intermediate message commands to remote message processors such as the fencing facility 30. The message processor 37 supports structured storage of the list and cache type, to be explained herein in connection with FIG. 4.

Figure 3:
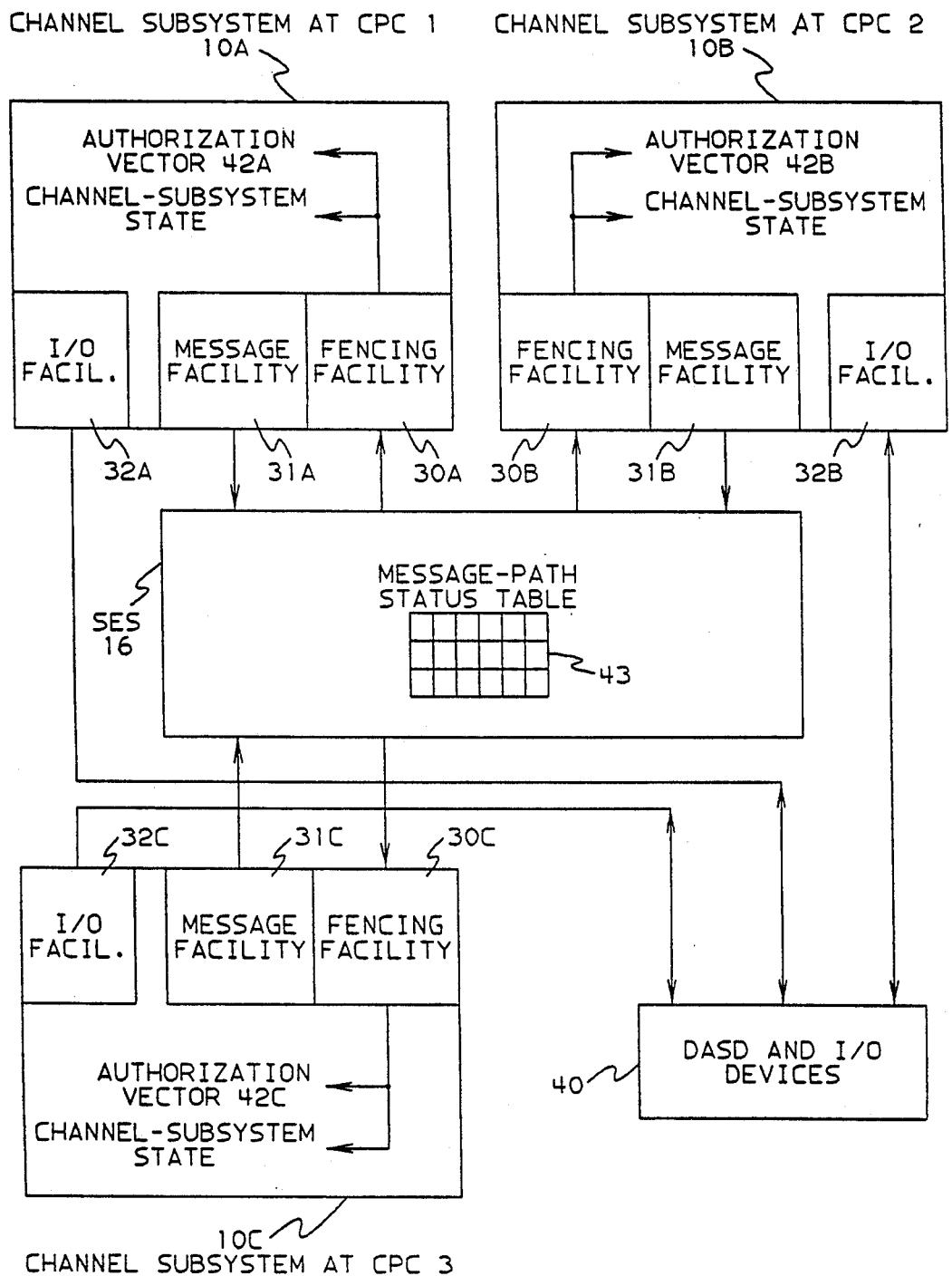
FIG. 3 is another portion of the system of FIG. 1 and shows an intermediate message processor of the SES facility and three CPCs.

The I/O facility 32 performs I/O operations and executes channel programs with DASD and I/O devices represented in FIGS. 2 and 3 at 40. The START SUBCHANNEL instruction is used to initiate an I/O operation in a manner well known in the art. The I/O facility is described the aforementioned ESA/390 Principles of Operation.

The message facility 31 performs message operations with the SES processors 35, 36 and 37, and with the fencing facilities 30. The SEND MESSAGE instruction is used to initiate a message operation with a SES facility 16 or fencing facility 30. This facility and instruction are disclosed in U.S. patent application Ser. No.07/860,380 for "Communicating Messenger Between Processor and a Coupling Facility", incorporated herein by reference as noted.

The fencing facility 30 executes commands that are received from other message facilities via the intermediate message processor. The commands are often issued by programs running on other CPCs. The commands operate on an authorization vector and a channel-subsystem-state indication, to be explained.

The SES-support facility 33 performs SES support functions in the CPC 10 and executes commands generated by the message processor 37 in the SES facility 16.

Five separate types of message commands are defined and communicated between the hardware components of the SES facility 16 and the CPC 10. Path commands are communicated from the message facility 31 to the message path processor 35 via the SEND MESSAGE instruction over a selected message path associated with the subchannel. Path selection is performed by the control program of the CPC 10. Three path commands are defined: identify message path, activate message path and deactivate message path.

The program uses the SEND MESSAGE (SMSG) instruction to initiate an operation by the message processor 37 of FIG. 2. Execution of the message-processor operation is accomplished by sending command information to the SES facility 16 and returning response information summarizing the result. Additionally, the command may specify the transfer of data from main storage to SES storage, a SES-write operation, or the transfer of data from SES storage to main storage, a SES-read operation.

Direct commands are communicated from the message facility 31 to the message processor 37 via the SEND MESSAGE instruction over a selected message path associated with the subchannel. Path selection is performed by the channel subsystem or CPU and the direct command must be communicated on an active message path. The direct command may also include a data transfer operation. Direct commands are not forwarded, but may generate one or more commands. The classes of direct commands include: global commands, retry-buffer commands, cache-structure commands, and list-structure commands.

Generated commands are communicated from the message processor 37 to the SES-support facility 33 in a designated CPC over a message path selected (by the message processor 37) from the path group for the system. The SES support facility comprises a processor for execution of the generated commands communicated over a message path. Path selection is performed by the message-path processor 35. No data transfer occurs. Generated commands must be communicated on an active message path. The generated commands include the cross-invalidate and list-notification commands, to be explained. Depending on the command, processing of the generated commands may or may not complete prior to completion of the associated direct command. However, a direct command does not complete before the action intended by the generated command is assured.

Intermediate commands are communicated for the message facility 31 to the intermediate-message processor 36 via the SEND MESSAGE instruction over a selected message path associated with the subchannel. Path selection is performed by the channel subsystem or CPU. Intermediate fencing commands are forwarded to the fencing facility 30 in a designated CPC.

Forwarded commands are communicated from the intermediate message processor 36 to a message processor. Path selection is performed by the message-path processor 35. Forwarded commands must be communicated on an active message path. Exactly one forwarded command is processed for each intermediate command that is received at the intermediate message processor 36. Processing of the forwarded command must complete prior to completion of the associated intermediate command.

All communications to a SES facility 16 from the CPC 10 may use the same message path, depending on the configuration, regardless of whether the destination is the message processor 37, message-path processor 35, or intermediate-message processor 36. All communications from the SES facility 16 to a CPC 10 may also use the same set of message paths, depending on the configuration, regardless of whether the destination is the fencing facility 30 or the SES-support facility 33.

The fencing facility 30 is a component of the ESA/390 channel subsystem. Fencing commands are issued by CPU programs, but they are executed by fencing facilities. Command execution involves fetching request operands from main storage, operating on storage objects at the fencing facility, and storing response operands in main storage.

Eight mechanisms exist for message paths: identification, activation, testing, deactivation, delivery of cross-invalidate or list notification commands, direct commands, responses, and delivery of fencing commands.

Message-path identification and activation is performed by the CPU program to allow for selective configuration of links for communicating commands. Testing is performed for subsequent commands that are delivered on the message paths with execution permitted only for active paths. When an interface control check is presented for a command and it is discovered that a path is no longer operational, the path is inactive at the SES facility 16 and the non-operational path is deactivated by the program over an alternate path.

Cache cross invalidation is performed by the SES facility 16 when, for instance, a write operation is executed for data in a SES cache 26 that is registered in one or more local caches 24A-24N. Before completing the SES write operation, the SES facility 16 sends a cross-invalidate signal to each system that contains a valid copy of the data in a local cache 24A-24N in order to maintain coherency of the local caches 24A-24N via a selected message path. This is disclosed in U.S. patent application Ser. No. 07/860,805 for "Sysplex Shared Data Coherency Method and Means" by Elko et al, incorporated herein by reference as noted.

Notification of list-state transition is performed by the SES facility 16 when a list operation is executed that causes a list which was empty to become not empty or that causes a list (to be discussed in connection with FIGS. 4 and 6) which was not empty to become empty. In either case, a list-notification command is sent to each system that is monitoring the list, informing the system of the state transition. This is disclosed, in U.S. patent application Ser. No. 07/860,809 for "Notification of State Transitions for Shared Lists of Data Entries" by J. A. Frey, et al.

A system fencing command, isolate or isolate using index, is issued by a program running on one CPC and is targeted to a system image located on a target CPC. Execution of the fencing command on the target CPC results in the isolation of the target system, or of a subsystem running on the target system, from resources shared by systems in a sysplex, that is, a system having multiple CPCs. This is disclosed in U.S. patent application Ser. No. 07/860,489 for "Interdicting I/O and Messaging Operations in a Multi-system Complex" by D. A. Elko, et al., incorporated herein by reference as noted. System fencing commands are routed to the target by sending the command to the SES facility 16, which forwards the command to the target system image.

The SES facility 16 continuously monitors the state of the physical links used to communicate commands by a message-path status table 43 of FIG. 3. Any failure, temporary or permanent, that may result in the loss of or change in the physical connection causes all the message paths associated with the physical link, as recorded in the message-path status table 43, to be placed in the inactive state. Commands are not sent on these links until the program has renegotiated the connections and reactivated the message paths. This prevents improper connections, such as from movement of cables, from causing commands to be incorrectly routed.

In addition to the SES monitoring function, the program may intentionally deactivate paths or change the associated system identifier. The SES facility 16 serializes these routing configuration changes against delivering new cross-invalidate, list notification or system fencing commands while the renegotiation is in progress.

The path-selection mechanism provided by the message path processor 35 is common to all forwarded and generated commands. The program negotiates the configuration and maintains the routing information independent of the specific command architectures. The command architectures interface with the path-selection mechanism by various means, including attach processing by the cache-structure and list-structure commands and command forwarding by fencing.

Fencing commands are sent from a message facility to the fencing facility by using an intermediate message processor in the SES facility 16 which forwards the command. The use of the intermediate message processor 36 avoids the need for direct connections among the CPCs in a sysplex.

FIG. 3 shows three CPCs and the SES facility 16.

When a fencing command is received at the intermediate message processor, it is forwarded to the fencing facility 30. The path-selection function in the message-path processor 35 is invoked by the intermediate message processor 36 to deliver the fencing command to the specified system.

Figure 4:
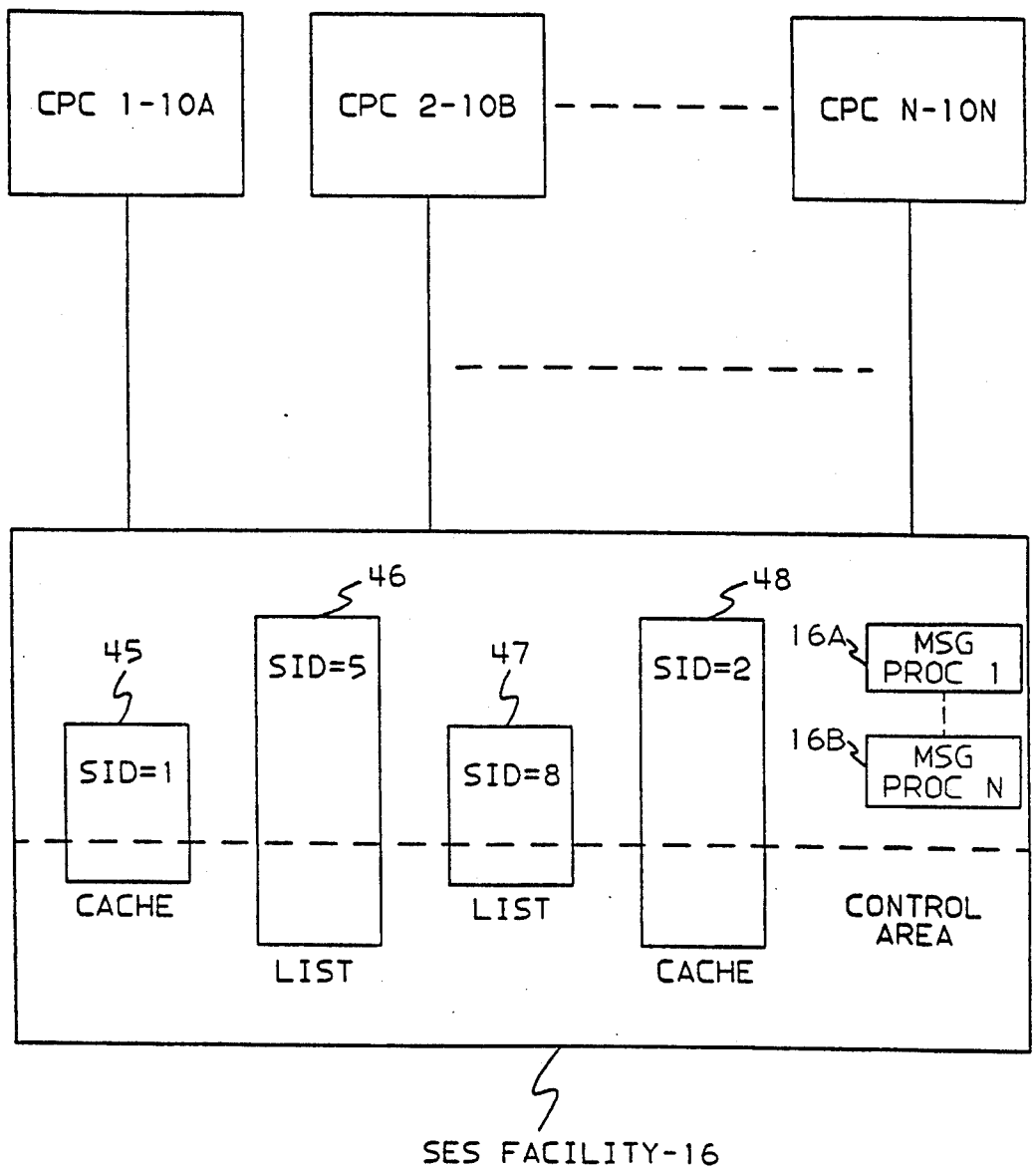
FIG. 4 is another portion of the system of FIG. 1 and shows multiple structures in a SES facility.

FIG. 4 shows a SES facility 16 having multiple structures 45-48. The message processor 37 provides the program with separate storage structures. Among these are the list structure (for example 46 and 47) and cache structure (for example 45 and 48). A set of commands is provided for each structure type, as well as additional commands for referencing global objects, to be discussed. The creation, deletion and attributes of a particular structure are controlled by the program through allocation and deallocation commands. FIG. 4 shows multiple structures of the same type which may exist concurrently. The allocated structures 45-48 reside in separate SES storage locations and are located by a structure identifier (SID). The SID value provides an identification of a target structure by a command. A command of a particular structure type, such as a cache-structure or list-structure command, may only address or alter the contents of a single structure of the given type.

SES storage contains data objects and control objects. The data objects may reside in any storage location, whereas the control objects are generally restricted to the control area.

Figure 5:
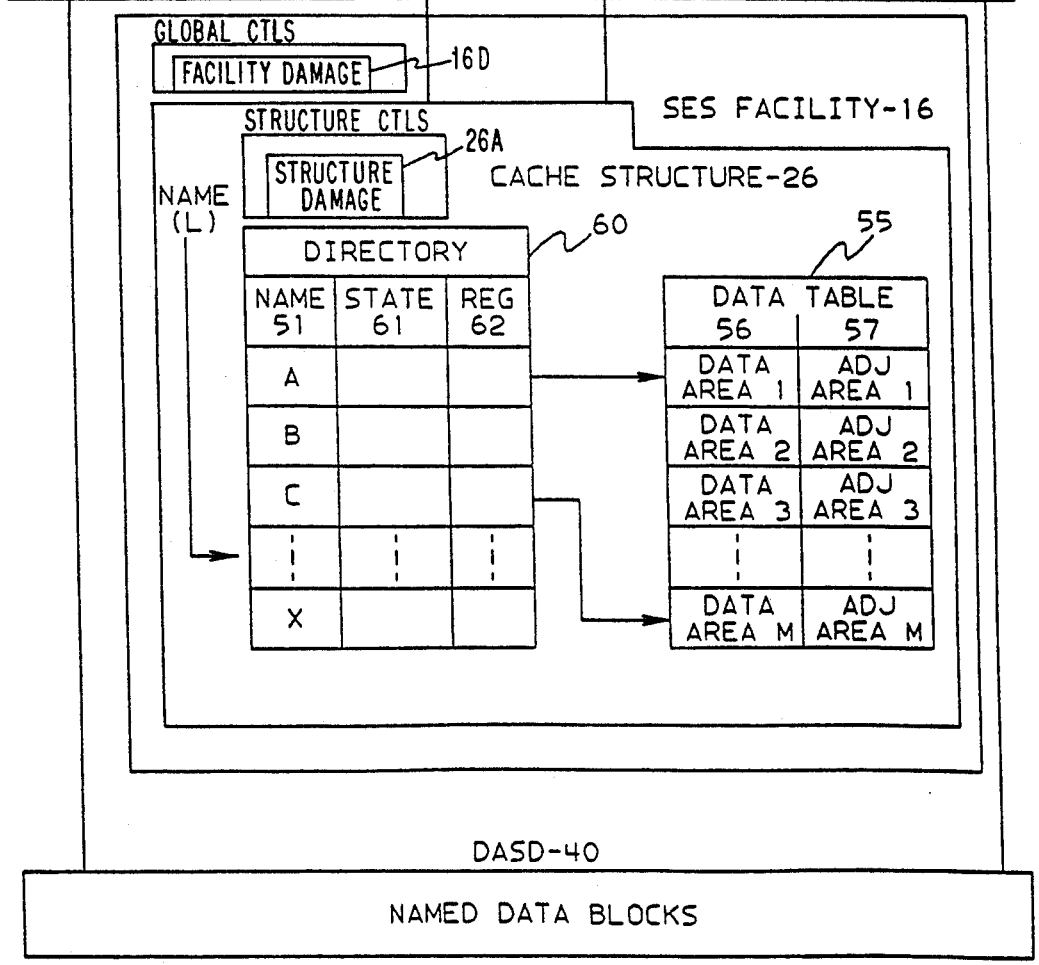
FIG. 5 shows the three-level storage hierarchy of the system of FIG. 1.
Figure 6:
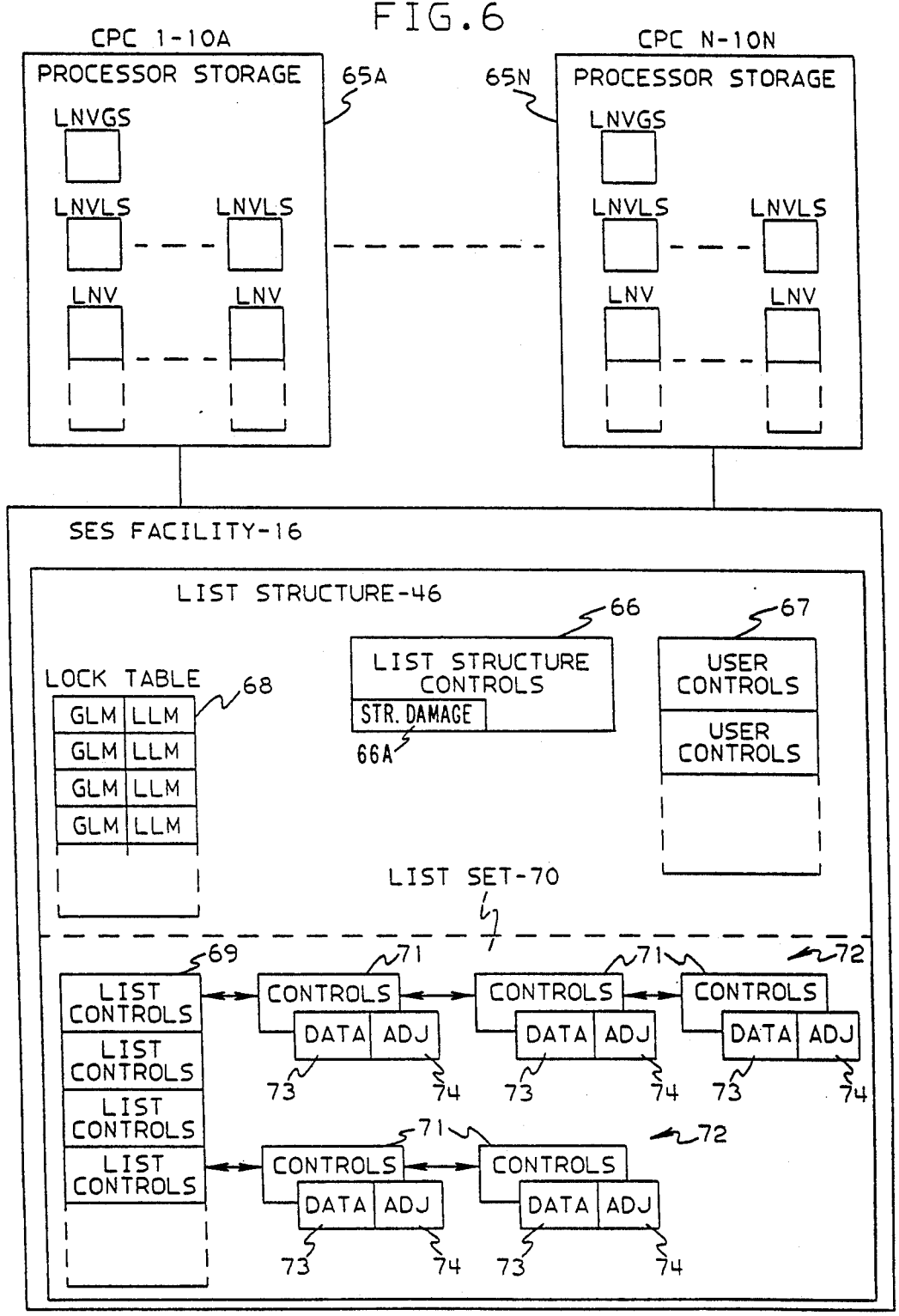
FIG. 6 illustrates one of the list structures of the structures shown in FIG. 4.

The partitioning of the SES storage and control area into structures as shown in FIGS. 4, 5 and 6 is managed by the program. The data objects are organized in tables or lists with an optional adjunct data area. The remaining objects are controls. The relative amounts of storage assigned to data and control objects are determined by program-specified parameters in the allocation commands. One of the cache structures 46 and 48 of FIG. 4 is shown as the SES cache 26 of FIG. 1.

As previously mentioned, each SES cache 26 of FIG. 1 is a component of a three-level storage hierarchy in a network of attached processors 10A-10N. FIG. 5 shows this hierarchy of storage. The lowest level of the hierarchy is DASD 40, the intermediate level is the SES cache 26, and the highest level is the local cache in processor storage. The DASD 40 and SES cache 26 are shared by the processors 10A-10N and are accessed by I/O operations and message operations, respectively. A local cache 24 is defined in each processor 10 and is accessed using CPU instructions.

As discussed in connection with FIG. 1, the processors 10A-10N are connected to the DASD 40 by I/O channels 15A-15N, and to the SES cache 26 by intersystem channels 18A-18N.

Referring to FIG. 5, data that moves through the storage hierarchy is given a name (columns 50A and 50B in the local caches 24A and 24B respectively, and column 51 in the SES cache 26). Data areas in the local caches 24A and 24B are shown in columns 52A and 52B, respectively, and optional adjunct data areas in the local caches 24A and 24B are shown in columns 53A and 53B, respectively. Each entry in the local caches 24A and 24B includes a state indicator shown in columns 54A and 54B, respectively. Each SES cache 26 may include a data table 55 which includes data areas (column 56) and adjunct data areas (column 57). The data sizes are variable with the range of variability being, in one embodiment, between 1 and n times the data-area element size. The data-area element sizes are fixed for each SES cache 26 and are powers of 2 with a minimum size of 256 bytes. An optional field of adjunct data may be associated with the data (columns 53A, 53B and 57). The names of the data (columns 50A, 50B and 51) are 16-byte values assigned by a programming protocol. The data is permanently resident in the DASD storage 40.

Copies or new versions of the data may also reside in any combination of SES-cache storage 26 and/or local-cache storage 24A and 24B. For instance, a data object may reside in SES-cache storage 26 and a subset of local caches 24A–24N, or it may reside in a subset of local caches 24A–24N but not in the SES-cache storage 26.

Each local cache 24A–24N is a processor storage area maintained by the program by utilizing the respective SES-support facility 33 on the CPC containing the local cache vector defined by a DEFINE VECTOR instruction. The DEFINE VECTOR instruction initializes controls in the SES-support facility 33 and assigns a local-cache token.

Each SES cache structure 26 is a structure in the SES facility 16 consisting of a directory 60 and, optionally, a data table 55 having a collection of data-area elements in columns 56 and 57. The directory 60 includes the name column 51 previously mentioned, and a state column 61 for indicating the state of each directory entry, and a register column 62 for pointing from each entry in the directory 60 to an entry in the data table 55. Each cache structure is designated by a structure identifier SID. Each SES cache structure in the SES cache 26 is created by an allocate-cache-structure command. The command is issued by an initialization procedure within the program which determines the attributes of the SES cache structure: size and number of data-area elements, number of directory entries, number of storage classes, and number of castout classes.

A local cache 24 is attached to the SES cache 26 by the attach-local-cache command that initializes controls in the SES facility 16 and associates the local cache with a set of paths over which the SES cache 16 issues generated commands to the SES-support facility 33, as discussed in connection with FIG. 2. A local cache 24 is attached to a SES cache structure 26 so that it may participate in the storage hierarchy. Coherency of copies of the data in the local caches 24A–24N and the the SES cache 26 controls in the SES cache 26 and enforced by cross-invalidate commands issued as generated commands to the various SES-support facilities 33 in their respective CPCs 10A–10N. The building of a set of paths in the SES facility is disclosed in U.S. patent application Ser. No. 07/860,646 for "Message Path Mechanism for Managing Connections Between Processors and a Coupling Facility" by D. A. Elko et al, incorporated herein by reference as noted.

The directory 60 is a collection of directory entries arranged as a fully associative array. The directory entries are partitioned into storage classes. The subset of changed directory entries is partitioned into castout classes. Whenever a named data object is placed in the higher two levels of the hierarchy (SES cache 26 and local cache 24) its state is registered in the state column 61 and its location is registered in the register column 62 by the SES-cache directory. State information indicates whether the data is changed, unchanged, or locked for castout, or resident in the SES-cache storage 26. Location information includes which of the local caches 24A–24N contains a copy. Certain SES-read and SES-write commands register the local-cache copy in the SES-cache directory. SES-write and SES-invalidate commands remove the registration and invalidate local copies.

When the data is located in the local cache 24, the state of the data is either valid or invalid. The valid state of local cache entries is maintained by controls in the SES-support facility 33. The data is validated by CP instructions and invalidated by SES-write and SES-invalidate operations. The valid state of the data is tested by a CPU instruction. A valid named data object must be registered in the SES-cache directory 60 in order to maintain local cache coherency. Local-cache coherency is maintained by the invalidation process. A registered local-cache entry may test as invalid. This is referred to as overindication of the invalid state and is permitted. This is disclosed in U.S. patent application Ser. No. 07/860,800 for "Integrity of Data Shared Between Caches Over a Link" by D. A. Elko et al, incorporated herein by reference as noted.

The SES-cache storage 55 is normally smaller than the DASD storage 40. Thus, periodically the changed data must be transferred from the SES cache 26 to the backing DASD 40. This process, called castout, is controlled by the program and involves the following operations:

A SES-read for castout operation is issued that sets the castout serialization and copies the data block to main storage which may or may not be put in the local cache 24.

An I/O operation is executed that copies the data block to DASD 40.

A SES-unlock castout locks operation is issued that releases the castout serialization.

Multiple castout processes may coexist for a single one of the local caches 24A–24N. Whenever data is locked for castout, an identifier for the local cache 24A–24N and an identifier for the castout process are placed in the directory 60. This is disclosed in U.S. patent application Ser. No. 07/860,806 for "Management of Data Movement from a SES Cache to DASD" by D. A. Elko et al, incorporated herein by reference as noted.

The least recently used unchanged data and directory resources are reclaimed by the SES cache 26 when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is maintained by the program. This is disclosed by U.S. patent application Ser. No. 07/860,807 for "Storage Management for a Shared Electronic Storage Cache" by D. A. Elko et al, incorporated herein by reference as noted.

FIG. 6 shows the connection of CPCs 10A–10N to the SES facility 16 wherein each CPC 10A–10N includes processor storage 65A–65N, respectively. The contents of one list structure 46 of FIG. 4 is shown in FIG. 6. It will be understood that the other list structures of the SES facility would be the same as the list structure shown in FIG. 6.

The list structure 46 comprises list-structure controls 66, user controls 67, and, optionally, a lock table 68, and/or a list set 70 with list controls 69 and list-entry controls 71.

Each lock table 68 consists of a sequence of one or more entries, which are numbered consecutively starting at zero. The list-structure type determines whether all the lock-table entries have a global-lock-manager GLM object, a local-lock-managers LLM object, or both.

The list-structure controls 66 are initialized when the list structure 46 is created. The list-structure controls 66 contains attributes of the structure, such as the structure size, list-structure type, lock-table-entry count, non-zero-lock-table-entry count, lock-table-entry size, list count, list-element size, the list-set-entry count, user-identifier vector and user controls, shown separately at 67.

The user controls 67 are created and initialized when the list-structure user is attached. The user controls 67 contain a list-notification token, system identifier, user-attachment control, and user state.

The list set 70 includes one or more lists represented by list controls 69, which are numbered consecutively starting at zero.

There are list controls 69 associated with each list 72. The list controls 69 contain a list-entry count, a list-entry-count limit, a list-monitor table, a list-state-transition count, and a user list control.

Each list 72 consists of a sequence of zero or more entries. The list-structure type determines whether all the list entries in the list set 70 have a data list entry 73, an adjunct list entry 74, or both.

One of the mentioned list-entry controls 71 is associated with each entry of a list 72. The controls 71 contain list-entry-location information and other information for managing the data in the adjunct area 74.

The list commands provide a means for writing a lock-table entry: that is a command may compare global-lock managers GLM and conditionally replace a global-lock manager GLM, a local-lock manager LLM, or both the global-lock and local-lock managers GLM and LLM. The list commands also provide a means for reading an entry in the lock-table 68 or the next nonzero lock-table entry, or for clearing a lock table 68.

The list commands also provide a means for conditionally creating, reading, replacing, moving, or deleting one entry in a list 72. A number of comparisons may be requested during these processes. They include a list-number comparison, a version-number comparison, a global-lock-manager GLM comparison, or any combination of the preceding. Additionally, when global locks are compared, local locks LLM may be compared. A list entry may be moved from one list 72 to another within the same structure 46 or from one position to another within the same list 72. This is disclosed in U.S. patent application Ser. No. 07/860,655 for "Method and Apparatus for Performing Conditional Operations on Externally Shared Data" by D. A. Elko, et al., herein by reference as noted.

The position of a list entry in a list 72 is determined when it is created, and may be changed when any entry in the list is created, deleted or moved. A list entry or list-entry position is located within a list set 70 by means of a list-entry identifier, an optional list-entry name, or by position.

A list-entry identifier is unique to a list set 70 and is assigned by the SES facility 16. A list-entry name is unique to a list set 70 at any particular instant and is provided by the program. The position is specified by means of a list number, a direction, and an optional list-entry key.

When list entry keys exist, the keyed list entries are ordered by key with the lowest numerical key at the leftmost position. Elements with the same key value may be located by first or last within the same key value.

When an unkeyed list entry is created or moved, the target list-entry position is always located by unkeyed position. When a keyed list entry is created or moved, the target list-entry position is always located by keyed position and first or last within the same key value.

The list commands also provide a means for synchronously writing and moving, moving and reading, or reading and deleting one entry of a list 72. More than one list entry may be deleted synchronously, and more than one data list entry 73 or adjunct list entry 74 may also be read synchronously. The data list entry 73 is always returned in the data area designated in main storage by the message-operation block. The adjunct list entry is returned in either the message-response block or the data area, depending on the command. This is disclosed in U.S. patent application Ser. No. 07/860,633 for "Apparatus and Method for List Management in a Coupled Data Processing System" by J. A. Frey, et al., incorporated by reference as noted.

Normally, a data list entry 73 contains application-program data, and an adjunct list entry 74 contains the control data associated with it.

List monitoring is a SES list function which is optionally requested by a list-structure user by means of the attach-list-structure-user and the register-list-monitor commands. The attach-list-structure-user command identifies to the SES the system on which the list-structure user resides and the list-notification vector LNV associated with the user. The register-list-monitor command allows the user to begin monitoring a list. This is disclosed in U.S patent application Ser. No. 07/860,809 for "Method and Apparatus for Notification of State Transitions for Shared Lists of Data Entries" by J. A. Frey, et al., incorporated herein by reference as noted.

Each processor storage 65A-65N includes a list-notification-vector global summary LNVGS, multiple list-notification-vector local summary LNVLS entries, and multiple list-notification vectors LNVs. The list-notification vector LNV is created by the DEFINE VECTOR instruction. The sizes or the LNVs may vary among different list users. The LNV is attached to the SES list structure 46 by means of the attach-list-structure-user command. Each entry in an LNV may be associated with a list 72 in the SES list structure 46. List transitions from the empty to non-empty and non-empty to empty states are detected by periodically polling the appropriate entry in the LNV from the CPU. The TEST VECTOR ENTRY instruction is provided for this purpose.

A LNV entry is set to 1 as a result of a list transition to the empty state. It is set to 0 as a result of a list transition to the non-empty state.

For each LNV created on the CPC there exists a list-notification-vector local summary LNVLS. As a program specified option, the LNVLS is placed into the active state when any list-notification command is processed against the associated LNV indicating an empty to non-empty list transition. The LNVLS is not updated as a result of an non-empty to empty list state transition. The update of the LNVLS is specified through use of a list-notification command option. The LNVLS is tested by the TEST VECTOR SUMMARY instruction and set or reset by the SET VECTOR SUMMARY instruction.

On a CPC there exists one list-notification-vector global summary LNVGS per CPC image. The LNVGS is not updated as a result of a non-empty to empty list state transition and is set when any LNVLS is set by a list-notification command. The LNVGS is tested by the TEST VECTOR SUMMARY instruction and set or reset by the SET VECTOR SUMMARY instruction.

When a user is monitoring a list, the empty to not-empty and not-empty to empty state transitions of the list result in the SES facility 16 issuing a list notification command to the system which initiated the user attachment.

The list-notification command causes the specified list-notification-vector LNV entry to be updated to reflect the empty or not-empty state of the monitored list 72. The list-notification command may also cause the specified list-notification-vector global summary LNVGS and list-notification-vector local summary LNVLS to be updated to reflect the not-empty state of the monitored list 72.

CONCURRENT COMMAND EXECUTION AND EARLY COMMAND RESPONSE

Because the SES facility may contain more than one message processor, potentially simultaneously executing different commands affecting the same or different SES objects (FIG. 4 at 16A, 16B), rules must be established within the SES to synchronize execution of these commands in a manner that ensures that the overlapping of the command execution within the SES is not visible to the processes executing with the CPC's (FIG. 4 at 10B, 10B, 10C, 10N) and accessing SES cache objects (45, 48) and/or list objects (46, 47).

Object References

Storage objects at the SES facility are referenced during the execution of SES facility commands. An object reference is the fetching or storing of an explicit value in the object.

During the execution of the command, all or some of the objects for that command may be fetched, intermediate results may be maintained for subsequent modification, and final results may be temporarily held prior to placing them in the objects.

The object references of one command occur after those of all preceding commands and before those of subsequent commands, as observed at the subchannel.

Message-Command Serialization

All object references by the message command are completed, as observed by other message commands, before either (1) status is withdrawn at the subchannel, or (2) the subchannel status is made available to any CPU. (I.e., the commands are ordered as observed at the subchannel.)

Object references are of three types: fetches, stores and updates.

Fetch References

When an object participates in the command execution only as a source, the object is called a fetch-type object, and the reference to the object is called a fetch reference.

Store References

When an object participates in the command execution only as a destination, to the extent of being replaced by a new value, the object is called a store-type object, and the reference to the object is called a store reference.

Update References

In some commands, the object participates both as a source and a destination. In these cases, the reference to the object consists first in a fetch and subsequently in a store. The object is called an update-type object, and the combination of the two accesses is referred to as an update reference.

The update reference is interlocked against accesses by other commands. The fetch and store accesses associated with an interlocked-update reference do not necessarily occur one immediately after the other, but all fetch and store accesses associated with references for other commands are prevented from occurring at the same object between the fetch and the store accesses of an update reference.

Within the limitations of the above requirements, the fetch and store accesses associated with an update reference follow the same rules as the fetches and stores described in the previous sections.

Object-Concurrent References

For object references, the accesses to all bytes within an object are specified to appear to be concurrent as observed by all CPUs. With a fetch-type reference, no store access to the object for another command is permitted during the time that bytes contained in the object are being fetched. With store-type references, no access to the object, either fetch or store, is permitted for another command during the time that the bytes within the object are being stored. Locks within the SES are used to enforce these object-concurrent reference rules, and are described in the section on the SES Locking mechanism below.

Command-Concurrent References

A command may reference several objects. The references to the objects must appear to be concurrent as observed by all CPUs. No store accesses for another command are permitted to any of the objects during the time that bytes within any of the objects are being fetched or stored. No fetch accesses are permitted by another command to any store-type object during the time when bytes within any of the store-type objects are being stored.

The objects are arranged according to an object hierarchy. The static SES controls are first, followed by the dynamic SES controls and the retry table. The retry-table entries are further ordered by the retry index. For a SES facility with multiple engines accessing a common object-storage area, the command concurrency requirements can be met by obtaining an internal lock on each object before it is referenced, and holding all of the locks until the command is suppressed or completed. Share locks are obtained for fetch-type objects and exclusive locks are obtained for store-type and update-type objects prior to the initial fetch. Obtaining locks in the order of the object-reference hierarchy avoids internal deadlocks. Locks need not be used for a SES facility which provides for the execution of one command at a time, completing one command before going on to another. Details of the SES Locking Mechanism are provided below.

Locking Mechanisms and Rules

Planning is required when more than one program uses a serially reusable object. A serially reusable object is an object that can be used by another program after the current use has been concluded; that is, an object that should not be used or modified by more than one program within a given span of processing.

A locking mechanism serializes access to an object. This locking technique is only effective, however, if all programs that depend on an object use the same locking mechanism. Each type of serially reusable object is assigned a lock. The system controls a hierarchical locking structure with multiple types of locks to synchronize the use of serially reusable objects. The system also handles all functions related to the locks. These functions include obtaining or releasing locks and checking the status of a particular lock on a processor.

The type of lock determines what happens when a program on one processor in a multiprocessor system makes an unconditional request for a lock that is held by another program on another processor. Locks described in the following sections are termed "spin" locks. A spin lock prevents the requesting program on one processor from doing any work until the lock is freed on another processor. Locking mechanisms of this type are described in "MVS/ESA Application Development Guide: Authorized Assembler Language Programs; GC28-1645".

The locks are arranged in a hierarchy to prevent a deadlock between functions on the processor(s). A function on a processor can request unconditionally only those locks that are higher in the hierarchy than the locks it currently holds, thus preventing deadlocks. Some locks are single system locks such that a single occurrence of the lock exists within the system. Other locks are multiple locks in which there is more than one occurrence of the lock within the system. For locks having multiple occurrences, the term "class lock" is used. Each occurrence of a class lock is associated with a collection of objects requiring serial reuse. For example, in a SES cache structure, a hash function is applied to the name of the data entry to be accessed. The results of the hash function is an index within the range of an array which serves as the anchor for a congruence class of directory entries. The directory entries in a congruence class form a queue. Associated with each hash class queue origin there exists a lock. These locks form a single class lock with multiple occurrences, one associated with each hash class. Similarly, there exists a lock for each storage class and castout class within a SES cache structure. A class lock exists for each list within a SES list structure.

Locking services at the SES are implemented using instructions which perform a serializing operation. A serializing operation at the SES insures all STORE references are observable by programs executing on any command-executing processor within the SES.

Locks provide the basis on which object concurrent reference rules are enforced within the SES. The locking services provided within the SES insure one command is never allowed to access a serially reusable resource in parallel with execution of a second command. The locks for objects within the SES are obtained in hierarchical order and thereby avoid deadlock. Further, locks are obtained on objects in the order of access to those objects. When access to a set of objects must be viewed by all commands and CPUs as occurring in sequence, locks on those objects are obtained and released in the order of object reference. All commands referencing a common set of objects operate within a set of rules which determine order of object reference. Commands may use well known two phase locking protocols wherein all lock(s) are obtained before any lock is released to achieve the required command concurrent reference requirements.

There exists a set of objects at the SES which are defined as being substantially correct. That is, the processing which changes those objects is required to complete correctly but need not have completed at the time the program initiated command which modifies that object provides a response. For example, directory entries for a SES cache exists on storage class queues, and updates to the storage class queue on which a directory entry exists may be requested by programming. It is not required that a change to the storage class associated with a directory entry complete prior to a command which requests such a change. However, it is required that if multiple commands change the storage class associated with a given directory entry, that the end result of all command processing assures that the directory entry is on the storage class queue specified by the last command which accessed the data entry and changed the storage class.

With the lock processing at the SES, it must also be assured that all commands which respond with data and an MRB after accessing and updating an object at the SES forward complete. This is required since the results of processing by the command on objects at the SES are visible to other programs and it is required that no partial command processing be visible to programming. Stated in another way, if a command obtains a lock, modifies a data object, releases that lock, and responds to the program initiating the command with a MRB indicating the action taken, that command must forward complete. Any post MRB processing to be performed by such a command must run to completion.

Receiving New Data Objects

Figure 12:
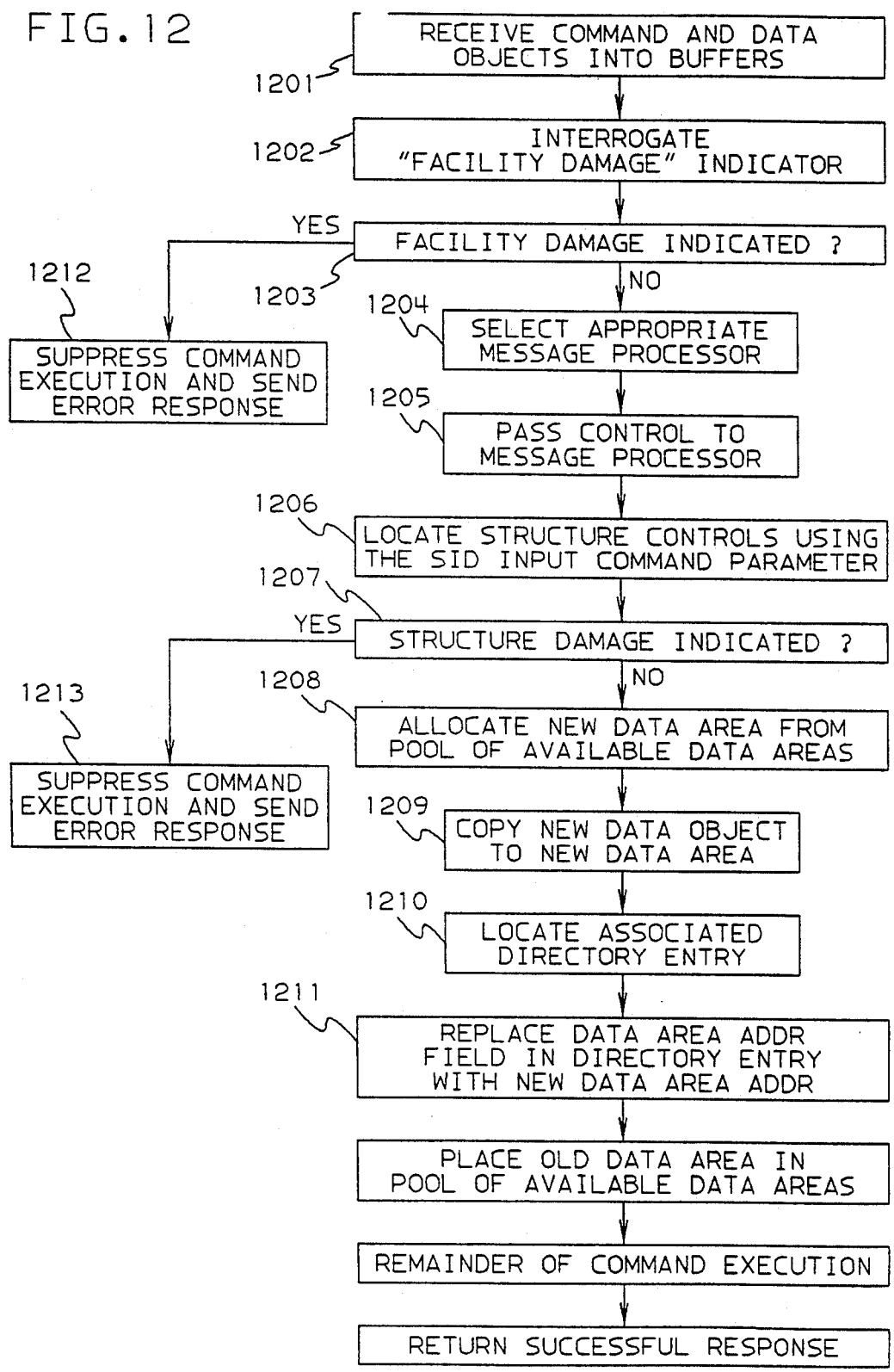
FIG. 12 is a flowchart illustrating the process of receiving new data objects at the SES and detecting permanent errors.

FIG. 12 illustrates the process of receiving new data objects of the SES. (The portion of the chart relevant to facility or structure damage will be discussed below under "forward command completion".) When a data object is transferred to SES as part of a message command, the arriving data is placed in a buffer (FIG. 1 at 20A) associated with the message path on which the data arrived 1201. The command description also arrives at the SES and is placed in a buffer (FIG. 1 at 20B) in a similar manner. When the command arrives, control is given to the message processor selector component of the SES facility (FIG. 1 at 16C) which interrogates the command description within the command buffer and dispatches the appropriate message processor 1204, 1205.

The message processor is responsible for command execution. As part of command execution, a data area is acquired 1208 from a free or reusable storage location within the SES structure and is utilized to contain the contents of the arriving data object. The message processor moves the data object from the message buffer to the new data area 1209 and chains the new data area to a directory entry to enable the SES data object locating mechanisms 1210, 1211.

The mechanism is also used when an existing data object within the SES structure is to be updated. The arriving data object is placed in a new data area 1208, 1209 even though the existing data object occupies its own data area. After the new data object is moved from the message buffer, the existing data area address within the directory entry is replaced by the address of the new data area. By insuring arriving data objects are placed in a new data area, the SES facility eliminates the possibility of partial updates to data objects being observed.

Forward Command Completion

Execution of message commands as the SES facility may involve several steps. Locking of objects referenced by the message command insures orderly execution of commands which process in parallel. When a command has processed to a point where the necessary command response and data can be made available to the requesting program, the message response block (MRB) may be constructed. Further command processing may be required to complete the command request. For example, a directory entry within the SES structure may be located by a primary queue for locating purposes. Additionally, the same directory entry may be on multiple other, secondary queues supported by the SES structure which are not directly related to data entry location. For example, a SES cache directory entry exists on a storage class queue and may exist on a cast-out class queue. Both of these are examples of secondary queues. The MRB and data to be returned by the command may be returned to the program prior to completion of the secondary queueing operation and/or updating of counts. The processing which follows initiation of return of the data and MRB is termed "post MRB" processing. Completion of the command during post MRB processing is termed "forward completion" of the command. Forward completion of such a command is required in order to insure that the operation requested by the program completes and in order to enforce the storage access rules. A SES facility which supports post MRB processing provides power, logic, and recovery processes to insure forward command completion is successful in the presence of power outages, as well as hardware and software errors.

The presentation of software and hardware errors to SES facility microcode may be achieved through use of well known mechanisms such as program and machine check interrupts. Such mechanisms are well known in IBM's ESA/390 architecture. Errors detected may include program logic errors, hardware malfunctions, unacceptable thermal deviations, or the transient loss of power.

When they occur, these interrupts result in control being routed to a control program component known as an interrupt handler which provides recovery for the interrupted process. During its execution, the SES command process records its forward progress by creating checkpoint state information which is made available to the recovery process. The state information is used to determine the point of forward completion.

To facilitate command completion in the event of a power loss, backup battery power may be utilized by the SES facility. The battery must be able to sustain the system long enough to allow the completion of the interrupted command processing. The SES facility may then be placed in a quiescent state after an orderly shutdown.

In the event recovery is not possible, or recursive errors occur during the recovery process, a permanent error state may be entered to prevent any further command execution against the SES objects that may be in an indeterminate state.

A permanent error state may be recorded at the SES in one of two ways. If the error is isolated to the SES structure being accessed, it is only necessary to prevent further access to the structure. In this case, damage is indicated by setting a "structure damage" indication in a control object associated with the structure. If the error cannot be isolated to a single SES structure, damage is indicated by setting a "facility damage" indication in a global control object (FIG. 5 at 16D).

When a command arrives at the SES facility, the message processor selector component interrogates the global control object to determine whether facility damage has been indicated (FIG. 12 at 1202). If so, command execution is suppressed and an indicative error command response is returned 1212.

If facility damage is not indicated, the message processor selector component dispatches an appropriate message processor (1204, 1205) which uses the structure identifier input command parameter 1206 to locate the controls associated with the SES structure being accessed. If structure damage has been indicated (FIG. 5 at 26A, FIG. 6 at 66A), command execution is suppressed and an indicative error response is returned 1213.

Parallel Command Execution Scenarios

Four scenarios will be given for processing of commands which utilize locking in support of object concurrent reference. The first three examples are based on FIG. 7. There exists a representative structure within SES which comprises directory and potentially associated data entries each on one of multiple queues. The queues are anchored in a Primary Directory Anchor array with each queue having an entry in the array comprised of a lock and a queue header. In the fourth scenario, the structure of FIG. 7 is augmented with a secondary queue—such as might be the case for a storage class queue—shown in FIG. 8. Updates to the secondary queue are only required to be substantially correct.

Scenario 1

In the first scenario, a directory entry is to be moved from queue_1 to queue_2. In support of this structure, two lock levels will be defined within the locking hierarchy. A lock named "low" will be a class lock lower in the hierarchy than a class lock named "high". The lock in each queue header can be obtained as either a low or high lock. Processing to move an entry from one queue to another will obtain the "low" lock of the queue with a lower number (either source or target) and will obtain the "high" lock of the queue with the higher number. The following steps are followed:
1. Lock queue_1 "low"
2. Lock queue_2 "high"
3. Locate specified directory entry
4. Remove directory entry from queue_1
5. Add directory entry to queue_2
6. Unlock queue_2
7. Unlock queue_1
8. Send MRB and data Following the above protocol meets object access reference rules and permits command concurrence where commands which execute in parallel do not reference a common queue.

Scenario 2

It is desirable to respond to the program initiating a request to the SES facility as rapidly as possible while still enforcing the object access reference rules. In the following protocol, the MRB and data may be sent before the command completes and with the assurance that the results of the command are not observable by programming. In this example, assume the directory entry is to be moved from queue 2 to queue 1.
1. Lock queue_1 "low"
2. Lock queue_2 "high"
3. Locate specified directory entry
4. Remove directory entry from queue_2
5. Unlock queue_2
6. Send MRB and data
7. Add directory entry to queue_1
8. Unlock queue_1

With this protocol, the program may receive a response before command completion. This improves the responsiveness of the SES to the command request. The results of the command appear atomic to programming as the move has removed the entry from queue_2 and will have placed the entry on queue_1 before programming can process a SES request which observes that the entry is not on queue_2 or queue_1. This is because the lock on the queue_1 object is held after the release of the queue_2 lock is released and after the MRB and data are returned. In this protocol, it is required that the command forward complete after returning the MRB.

Scenario 3

It may appear that the previous two scenarios could have been accomplished with a single class lock. However, the following protocol leaves open the possibility that programming can observe partial command results.
1. Lock queue_2
2. Locate specified directory entry
3. Remove directory entry from queue_2
4. Unlock queue_2
5. Lock queue_1
6. Send MRB and data
7. Add directory entry to queue_1
8. Unlock queue_1

It will be observed that if the processor on which this SES command is executing is delayed between steps 4 and 5, it would be possible for a series of commands executing on a second processor at the SES to observe that the directory entry is not on either queue_1 or queue_2. The move command, like other SES commands, is to be viewed by programming as atomic. Having partial command execution visible to programming, is a violation of the concurrent object access rules enforced by the SES facility. This is true even though the MRB has not been sent before the lock on queue_1 is obtained. In this protocol, it would be true that programming could not predict which queue the entry would be found on. Either queue_1 or queue_2 is acceptable since programming cannot predict the order of concurrent command execution at the SES. The order of command execution can only be assured by observing the status at the subchannel being made idle or status pending. This protocol is a violation of the access rules nonetheless since partial results of a single command are visible.

Scenario 4

In this example, based on FIG. 8, a directory entry exists on a primary queue for locating purposes and on a secondary queue for other SES functional purposes. The secondary queue must accurately reflect the order of command execution at the SES but need not be updated at completion of command execution. To achieve these goals, a lock is associated with each primary locating queue and a lock is associated with each secondary queue. The secondary queue lock is higher in the lock hierarchy that the primary queue lock.

Within the directory entry, a sequence number is defined which represents a count of events which change the secondary queue. A command is received and processed by the SES which accesses a directory entry and changes the secondary queue. During command execution, the MRB is sent before command completion. Additionally, processing is required between the time the MRB is sent and the secondary queue operation is performed. This processing is sufficient in scope to mandate release of the lock which serializes the primary location queue across the MRB response and subsequent command processing up to the secondary queue manipulation.
1. Lock primary_queue
2. Locate requested directory
3. Update secondary change count in directory
4. Save secondary change count
5. Unlock primary_queue
6. Send MRB
7. Command processing required before secondary_queue action
8. Lock primary_queue
9. Locate directory
10. Verify secondary change count
11. Lock current secondary_queue
12. Remove the directory from current secondary_queue
13. Unlock current secondary_queue
14. Lock new secondary_queue
15. Update directory with new secondary_queue
16. Add the directory to new secondary_queue
17. Unlock new secondary_queue
18. Unlock primary_queue It will be noted that the lock is obtained on the primary queue and the directory entry is located a second time at steps 8 and 9. This action is taken because a concurrently executing command may have changed the primary queue on which the directory entry exists while this command is processing. At step 3, the change count is changed and saved under the primary queue lock. At step 10, the saved change count is compared to the current change count in the directory entry with the primary lock held. Should another command have executed and also updated the secondary change count, this command will end without changing the secondary queue for the directory entry. This processing insures that the end result of multiple command executions causes the directory entry to exist on the secondary queue associated with the execution of the last command processed at the SES.

Concurrent Command Processing

In the above, the rules by which the SES facility may process multiple commands in parallel have been detailed. In order to support multiple command execution, locking protocols are required. These locking protocols are available to provide serial reuse of objects by commands internal to the SES facility where incompatible access references are made. SES commands utilize these locking protocols to insure object concurrent access within the SES facility such that programming observes commands to execute in order and atomically.

COMMAND RESTART

Commands which execute at the SES facility are placed under timing limitations. The duration of time any one command may be in execution is determined by several factors. First, all commands are intended to complete within the link time out interval. This prevents normal command execution from causing interface control checks at the intersystem channel at the CPC. An interface control check represents an unexpected or unusual error condition. When presented, this condition results in error logging and the execution of disruptive message path recovery procedures by the operating system software. It is therefore imperative that this condition not be reported due to normal but lengthy command execution. Second, commands are defined to execute for no more than a period of time which enables programming to view all processing performed at the SES to be of roughly equivalent duration. Roughly equivalent duration of command execution removes requirements on CPC programming and within SES to support interruptible command execution and prioritization of command execution.

In order to accomplish the processing required by programming, some command processes comprise multiple command operations which are defined to complete processing at the SES by establishing a restart environment. Four types of restart environments are defined for SES commands.

1. A command may retrieve multiple data or directory entries from a SES structure. Such a command may locate the requested data or directory entries by processing a queue of directory elements which meet command specification. For example, a castout class may be processed by the SES cache command "Read Castout Class". In another example, entries on a specified list within a SES list structure may be processed by the "Read List" command. When a SES model timeout occurs during execution of such a command, a value is returned to the program which enables continuation of processing of the specified queue. The value returned may be a restart token or specific identification of the next element to be processed such as list entry controls or the next lock table entry number. Programming reinitiates command execution by specifying the returned restart token. Programming is required to serialize access to the queue being processed if a complete or consistent view of the queue is required.

2. A command may retrieve multiple data or directory entries from a SES structure. Such a command may locate the requested data or directory entries by processing the fixed directory of entries matching on values provided with the command specification. For example, an "Invalidate Complement Copies" command to a SES cache matches on a name and associated name mask field during processing of the cache directory. Similarly, the SES list structure command "Delete List Set" processes the list entry controls matching on command specified list number and version number. When a SES model timeout occurs during execution of such a command, a value is returned to the program which enables continuation of processing of the specified queue. The value returned is a restart token which represents the next entry within the fixed directory to be processed. Command execution is reinitiated by programming with the specified restart token.

3. A command may provide specification of multiple directory or data entries within a SES structure. For example, the SES list command "Delete List Entries" specifies a number of list entries by list entry identifier or name. The "Unlock Castout Locks" command specifies a list of items which identify cache directory entries by name. When a SES model timeout occurs during execution of such a command, a value is returned to the program which indicates the number of specified operations which were performed. In the preceding examples, the current data index and current list item are returned respectively. Programming may continue processing by reissuing the command with the remainder of the values specified by the reissued command.

4. A set of SES commands exist which have a scope which is more broad than the individual process or system from which the command was initiated. More specifically, these commands cause the allocation, or of a structure deallocation, or detachment of users associated with a SES structure. The impact to overall sysplex operation is significant and effects multiple systems and users of the SES structure. These commands also may execute for an extended period of time given the size of a SES structure and the number of entries within the structure effected by the termination of a user. Each of these commands establishes processing phases where each phase may complete within the SES model timeout interval. At each phase of processing, command execution may be checkpointed. The checkpoint status of these commands is maintained within the SES structure. Therefore, continuation of these commands may be achieved by programming on any system attached to the SES. When such a command is reissued by programming, the status of command execution is restored from the checkpoint status stored within SES and subsequent phases of command execution are performed. For example, an "Allocate Cache Structure" command may initialize directory and data areas. Free queues of directory and data areas are also required. Phases of execution may be defined implicitly by the command—such as initialization of control areas—or explicitly by the command—such as initialization of a fixed number of directory entries. Likewise, a command such as "Detach List Structure User" may determine processing phases comprised of resetting the list-monitor-active bit of a fixed number of list-monitor-table entries.

In the first three cases above, command processing is completed at a boundary at which modifications of objects being updated are in a consistent state with respect to processing of other commands. For example, when deleting multiple list entries, a given list entry is either deleted or not deleted. It is not partially processed.

Figure 10:
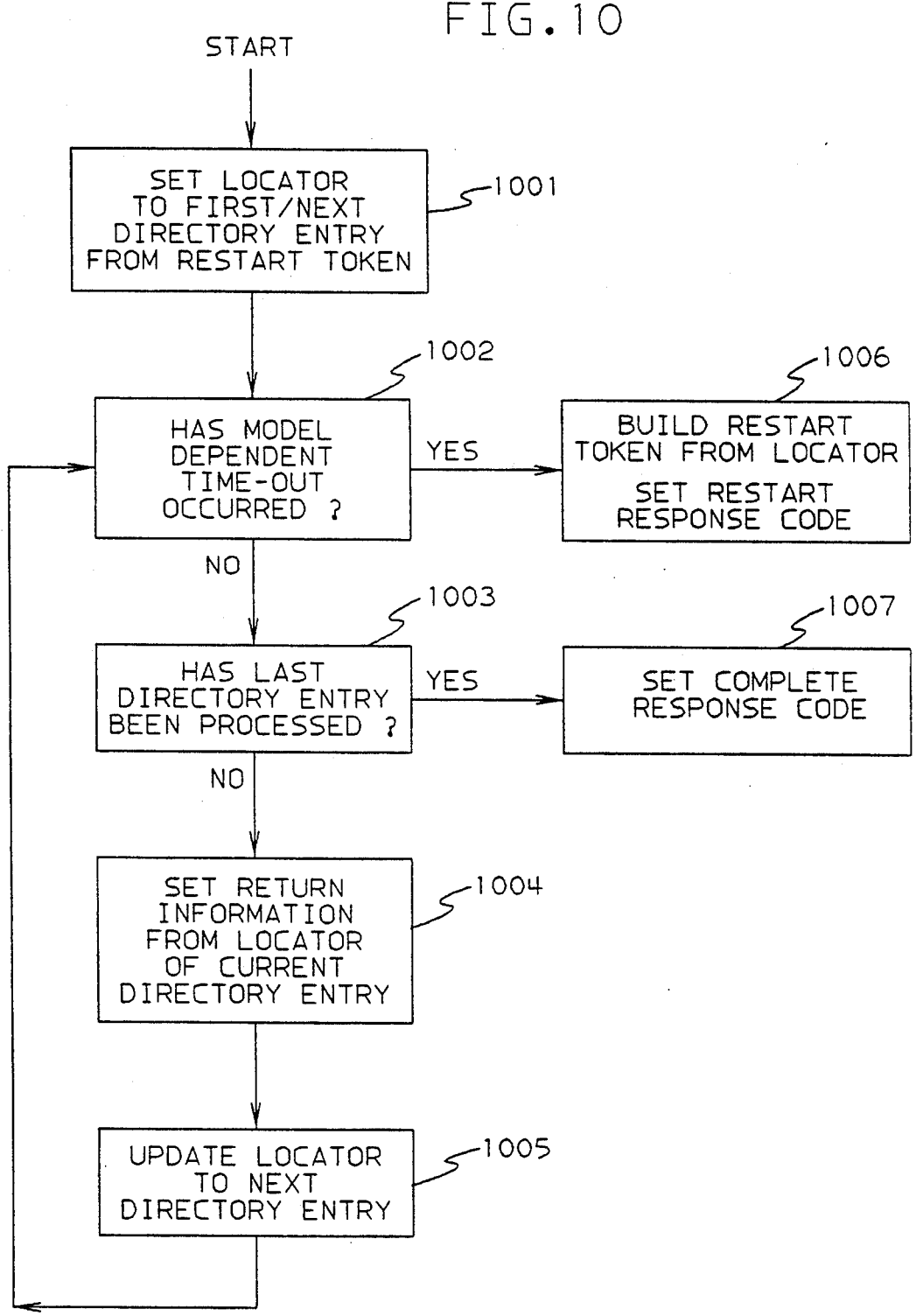
FIG. 10 is a flowchart illustrating an example of restart processing.

Processing for cases one through three is shown in FIG. 10. At 1001, command processing is initiated by locating the first or next object to be acted on based on specification of the restart token with the command. Checking for a model dependent timeout is performed at 1002. If a timeout condition has not occurred, a determination is made at 1003 if any remaining processing is required. If the command is not completed, the next object to be acted on is processed at 1004. The locator for the next object to be acted on is updated at 1005. If a timeout condition occurs before the command has completed processing, a restart token and indicative response code is returned to programming at 1006. If no more objects require processing by this command, a response code indicating command completion is returned to programming at 1007.

Figure 11:
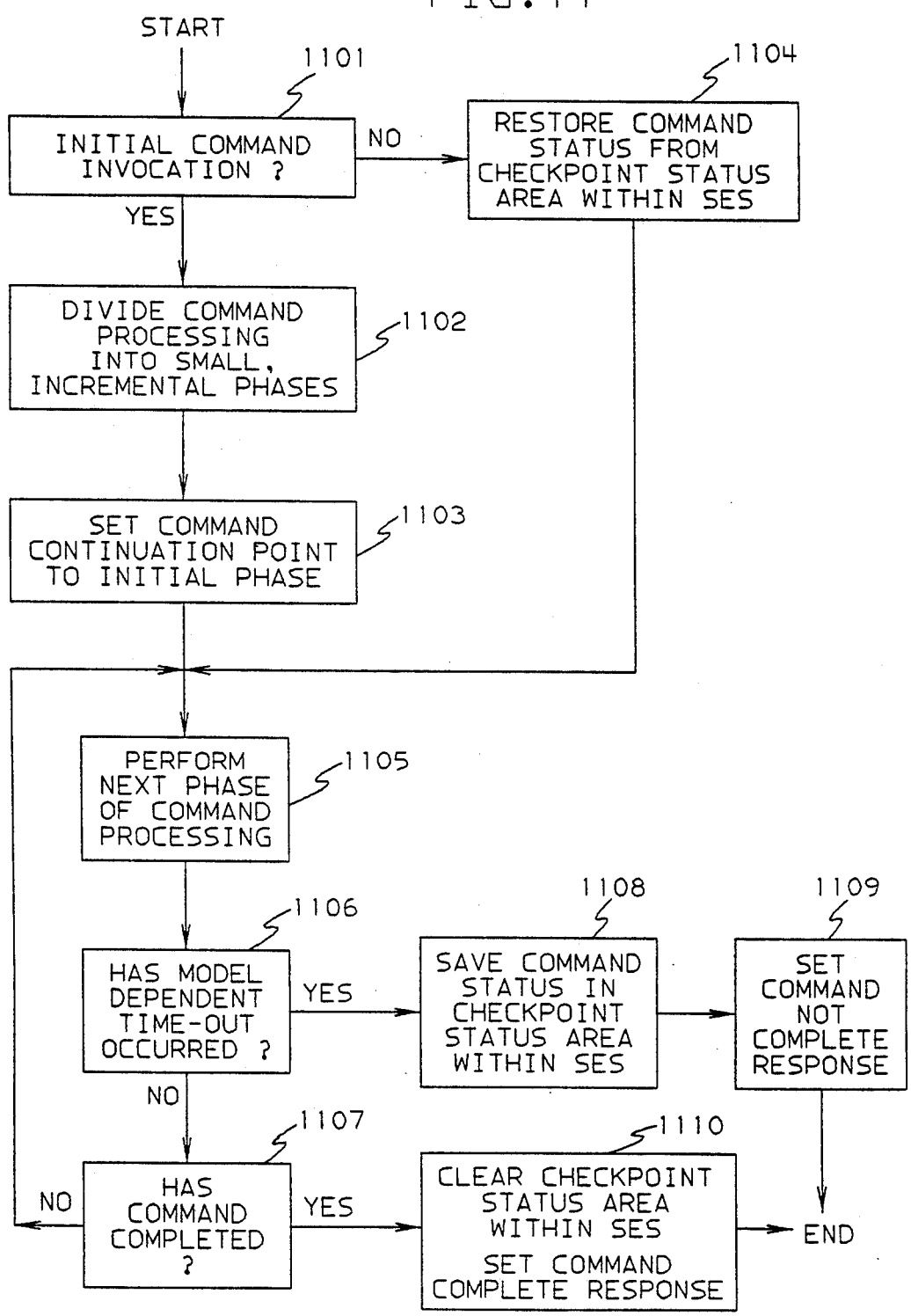
FIG. 11 is a flowchart illustrating a further example of restart processing for commands of broad scope.

Processing for case four is shown in FIG. 11. At 1101, a determination is made regarding initial command processing or command continuation based on status stored at the SES regarding the command. For initial command processing, phases of command execution are either known or established at 1102. The next phase to be processed for the command is established for initial command execution at 1103. For continuation of command execution, the next phase to be processed for the command is established from the checkpoint status area within SES at 1104. Command processing continues at 1105. At 1106 a check is made for a model dependent timeout. If a model dependent timeout has not occurred, the next phase of command execution is established at 1107. If a timeout condition has occurred, command status is saved in the checkpoint area associated with the command within the SES at 1108 and an indicative response code is returned to programming at 1109. When the command has completed processing, the status checkpoint area within SES associated with the command is cleared and a command complete response is returned to programming at 1110.

NO BLOCKING DIRECTORY SCAN

Data elements are defined to exist in an electronic storage facility which may be shared among multiple users. These data elements may be organized into different groups so that subsets of the elements may be managed based on characteristics common to the group. For each data element, a directory element exists which describes the data element and indicates the group in which it resides. Operations against the data elements in the storage facility are provided which result in the addition, deletion, and movement of the directory entries within and among the groups. A mechanism is described for providing the ability for a program having access to the storage device to interrogate all directory entries within a designated group without the need for explicit serialization against ongoing concurrent operations.

In FIG. 9, a configuration is shown which enables a network of CECs to issue requests to and receive responses from a coupling facility. One such coupling facility is a shared electronic storage facility (SES). Programming can request operations to be performed by the SES which are designed to return data and status information.

Most of the operations performed at the SES are atomic in nature. The command executes to completion before the response is returned to the program. However, certain operations, such as directory searches, require more processing than can be accommodated within the amount of time allotted for execution of a single command. For the long running commands, a model dependent timeout of the command is enforced. During this procedure, certain command execution state data is returned to the program and the operation at the SES is terminated. The program is responsible for passing the restart state data to the SES on subsequent requests in an iterative fashion in order to complete the intended operation.

When a command is interrupted due to the timeout condition, any serialization internal to the SES to sustain the operation is released allowing other commands to execute against the same data objects. This could result in making the restart state data passed to the program invalid since the restart data associated with the operation would likely be the address of the next directory entry on a queue to be processed. Invalid restart data may cause unpredictable processing results including looped directory searches, directory element hiding during a search, or internal errors in the SES such as addressing exceptions. Therefore, without some other technique, programming would be required to obtain serialization to block intervening requests made by other systems until all long running command iterations had been completed.

To illustrate the problem, consider a storage class within a SES cache structure containing 4 directory elements shown in FIG. 9.

The program initiates a command which starts the scan of the storage class queue. The model dependent timeout expires and the SES returns restart data containing the address of directory element C which was obtained during the traversal of the storage class queue from directory element B.

Another program then initiates a SES command that results in a reference to data represented by directory element D. To maintain LRU ordering of the directory elements in the storage class, the SES moves directory element D to the head of the queue.

When the directory scan is continued using the returned restart data, element D will not be processed since it is now on the queue logically ahead of the point of restart.

Note that the set of in use directory entries may change during the iterative scan process. The set of directory entries that must be processed before the scanning is complete consists of the valid directory entries that exist at the initiation of the scan processing and remain valid. Directory entries that are assigned or released after the scanning is initiated, do no need to be processed.

In order to eliminate the need for explicit serialization against the data objects being processed by a directory scan, it is necessary to ensure the restart data passed back to the program remains valid for the next iteration of the operation. Three things are needed to accomplish this.

Statically allocated storage for directory elements of a SES structure

A command restart token that addresses the first or next directory element to be scanned in the static pool Directory scanning commands which support directory selection criteria against the contents of a directory element

Statically allocated directory storage

Space for directory elements within a SES structure is allocated at the time the structure is created. This pool of directory elements is managed in such a way that individual elements within the pool may be in-use or not in-use for the structure at a given point in time. When an element is in-use, it may be queued to other in-use directory elements through the use of pointers resident in the element itself. However, at no time during the life of the SES structure does the physical memory location of a directory element change. There is no dynamic expansion or contraction of the directory pool during the life of the structure and the elements within the pool are not freed or made available to another SES structure.

Command restart token

The command restart token contains information needed to address an element within the statically allocated directory element pool. A restart token of zero has special meaning and is used to denote the first directory element in the pool. Any nonzero command restart token dispensed by the SES is valid for the life of the SES structure regardless of other intervening operations which may alter the state and contents of the directory element.

Directory selection criteria

Since it is necessary to interrogate all directory elements in the statically allocated pool, the selection of a directory element during a scan cannot be implied through the method of traversal. Therefore directory scanning commands must accept selection criteria from the program and apply it in the search. For example, the program may request that only in-use directory elements resident on list 5 with a key of 7 are to be selected.

DETACH RESOURCE RECLAIM

Use of a SES structure is managed through programming with assistance of status stored at SES for identification of users attached to each SES structure. Programming utilizes the "Attach Local Cache" command to associate a user with a SES cache structure. Similarly, programming utilizes the "Attach List Structure User" command to associate a user with a SES list structure.

During normal execution of users associated with a SES structure, objects within the SES structure are modified to reflect user interest. For example, within a cache, the local cache register represents a users' interest in a given directory entry. The castout lock identifies a user performing the castout process for a data item. Likewise, the list monitor table identifies users which have registered for list monitor notification in order to be notified of changes in the state of lists within the structure.

When a user terminates, reclaim of the SES resources representing the user is performed by the SES facility, under programming control. In order to enable reuse of the user identifier and associated user controls at SES, it is first necessary to break all latent binds to all local cache registers or list monitor tables which reflect registered interest on behalf of the terminated user. Failure to break these binds prior to reassignment of a UID to a new user, could result in erroneous update of state information maintained at the remote CPC for the new user reflecting changes in state information at SES associated with the terminated user. Through issuance of the "Detach Local Cache" command and the "Detach List Structure User" command, these resources are set to an initialized and available state. Multiple invocations of these commands may be required to complete the reclaim processing. Internal checkpoint processing for these commands assures programming the ability to make progress toward command completion and enables programming to reissue these commands from any CPC attached to the SES facility. When all resources associated with a user in a cache or list structure have been reclaimed by the detach process, the detach command completes.

The DETACH commands allow resource reclamation on behalf of a terminated user to be performed by a peer resident program on a different CPC, enabling the cleanup process to run in spite of failure of the CPC on which the terminated user resided. Further, the peer program does not need to be attached to the target structure.

Global Objects

The global objects identify the SES facility, describe its state, define its model-dependent limitations and summarize the status of its resources.

The fixed global controls are set at SES power-on reset and are not modified by any SES command.

The program-modifiable global controls are initialized at SES power-on reset and may be modified by subsequent SES commands.

The fixed global controls are summarized in the following table.

| Fixed Global Controls | Acronym |
|---|---|
| SID limit | SL |
| Total control space | TCS |

The program-modifiable global controls are summarized in the following table.

| Program-Modifiable Global Controls | Acronym |
|---|---|
| Free control space | FCS |
| Free space | FS |
| SID vector | SV |
| Total space | TS |

Free Control Space (FCS)

An object or field that specifies the amount of control storage which has not yet been assigned and is available for assignment to a structure. The free-control-space value is initialized to the same value as the total-control-space value.

Free Space (FS)

An object or field that specifies the amount of storage which has not yet been assigned and is available for assignment to a structure. The free-space value is initialized to the same value as the total-space value and represents the largest structure size that may be allocated in the SES facility.

SID Limit (SL)

An object or field that specifies the maximum supported SID value.

SID Vector (SV)

An object or field that specifies the assigned SIDs.

Total Control Space (TCS)

An object or field that specifies the amount of storage defined in the SES control storage and available for the allocation of control objects for a structure.

Total Space (TS)

An object or field that specifies the amount of storage defined in the SES storage and available for the allocation of structures.

| List Limits | Acronym |
|---|---|
| List-number limit | LNL |
| Lock-table-entry-characteristic limit | LTEXL |
| User-identifier limit | UIDL |

List-Number Limit (LNL)

An object or field that specifies the maximum list number.

Lock-Table-Entry-Characteristic Limit (LTEXL)

An object or field that specifies the maximum size of a lock-table entry.

User-Identifier Limit (UIDL)

An object or field that specifies the maximum user identifier. The maximum-user-identifier value is the maximum number of list-structure users and list-notification vectors that can be attached to each list structure.

SES List Structure

A list structure consists of list-structure controls, user controls, and either a lock table, or a list set with list controls and list-entry controls, or both.

Each lock table consists of a sequence of one or more entries, which are numbered consecutively starting at zero. The list-structure type and lock-table-entry characteristic determines whether all the lock-table entries have a global-lock-manager object, a local-lock-managers object, or both.

The list-structure controls are initialized when the list structure is created. The list-structure controls contain the structure size, list-structure type, lock-table-entry count, nonzero-lock-table-entry count, lock-table-entry size, list count, list-element size, maximum data-list-entry size, maximum list-set-entry count, list-set-entry count, maximum list-set-element count, list-set-element count, user-identifier vector and user-structure controls.

The user controls are created and initialized when a list-structure user is attached. The user controls contain a list-notification token, system identifier, and user-attachment control.

Each list set consists of one or more lists, which are numbered consecutively starting at zero.

There are list controls associated with each list. The list controls contain a list-entry count or list-element count, a list-entry-count limit or list-element-count limit, a list-monitor table, a list-state-transition count, and a user list control.

Each list consists of a sequence of zero or more entries. The list-structure type determines whether all the list entries in the list set have a data list entry, an adjunct list entry, or both.

There are list-entry controls associated with each list entry. The controls contain list-entry-location information, a data-list-entry size, and a version number.

LIST STRUCTURE OBJECTS List Structure

The possible list-structure objects consist of
List-structure controls
User controls
List controls
List-entry controls
Lock table
List set

List-Structure Controls

The fixed list-structure controls are initialized when the list structure is created and remain unchanged until it is deallocated.

The program-modifiable list-structure controls are initialized when the list structure is created. The program-modifiable control values may be changed by SES commands.

The fixed list-structure controls are summarized in the following table.

| Fixed List-Structure Controls | Acronym |
|---|---|
| List count | LC |
| List-element characteristic | LELX |
| List-structure type | LST |
| Lock-table-entry characteristic | LTEX |
| Lock-table-entry count | LTEC |
| Maximum data-list-entry size | MDLES |
| Maximum list-set-element count | MLSELC |
| Maximum list-set-entry count | MLSEC |
| Structure size | SS |

The program-modifiable list-structure controls are summarized in the following table.

| Program-Modifiable List-Structure Controls | Acronym |
|---|---|
| List-set-element count | LSELC |
| List-set-entry count | LSEC |
| Nonzero-lock-table-entry count | NLTEC |
| User-identifier vector | UIDV |
| User-structure control | USC |

List Count (LC)

An object or field that specifies the number of lists created.

List-Element Characteristic (LELX)

An object or field that specifies the number of bytes in each list element.

List-Set-Element Count (LSELC)

An object or field that specifies the number of list elements that have been assigned to list entries or retry-data blocks, or both, in the list set.

List-Set-Entry Count (LSEC)

An object or field that specifies the number of existing list entries in the list set.

List-Structure Type (LST)

A object or field that indicates the list objects created on allocation. A field contains a counter indicator (CI), a lock indicator (LI), a data indicator (DI), an adjunct indicator (AI), a name indicator (NI), and a key indicator (KI).

The counter indicator specifies that either:
a list-entry count and list-entry-count limit are defined or
a list-element count and list-element-count limit are defined.

The lock indicator specifies whether or not a lock table is created.

The data and adjunct indicators specify whether:
no list set is created,
list entries have adjunct only,
list entries have data only, or
list entries have data and adjunct in the list entries.

The name indicator specifies whether or not list entries are named.

The key indicator specifies whether or not the list entries are keyed.

Lock-Table-Entry Characteristic (LTEX)

An object or field that specifies the number of bytes in each lock-table entry.

Lock-Table-Entry Count (LTEC)

An object or field that specifies the number of lock-table entries allocated.

Maximum Data-List-Entry Size (MDLES)

An object or field that specifies the maximum size of the data list entry.

Maximum List-Set-Element Count (MLSELC)

An object or field that specifies the maximum number of list elements that are available for assignment to list entries or retry-data blocks, or both, in the list set.

Maximum List-Set-Entry Count (MLSEC)

An object or field that specifies the maximum number of possible list entries in a list set.

Nonzero-Lock-Table-Entry Count (NLTEC)

An object or field that specifies the number of non-zero lock-table entries that exist in the structure.

Structure Size (SS)

An object or field that specifies the amount of storage allocated.

User-Identifier Vector (UIDV)

An object or field that specifies the assigned UIDs.

User Structure Control (USC)

A field per structure defined by the user.

User Controls

The user controls are created and initialized when a list-structure user is assigned and are deleted when the list-structure user is unassigned.

The user controls are summarized in the following table.

| User Controls | Acronym |
| --- | --- |
| List-notification token | LNT |
| System identifier | SI |
| User-attachment control | UAC |

List-Notification Token (LNT)

A value that specifies a list-notification vector to the system.

System Identifier (SI)

A value specified by the program when a message path is activated. The system identifier is maintained in the message-path status vector and copied into the user controls when an attach-list-structure-user command is communicated over the message path.

User-Attachment Control (UAC)

A field per attached user defined by the user.

List Controls

There is a list-controls object for every list created in a list structure. All the list controls except the list-entry-count limit and the list-element-count limit are initialized to zero when the list structure is created.

The list controls are summarized in the following table.

| List Controls | Acronym |
| --- | --- |
| List-element count | LELC |
| List-element-count limit | LELCL |
| List-entry count | LEC |
| List-entry-count limit | LECL |
| List-monitor table | LMT |
| List-state-transition count | LSTC |
| User list control | ULC |

List-Element Count (LELC)

An object or field that specifies the number of list elements currently in the list.

List-Element-Count Limit (LELCL)

An object or field that specifies the maximum number of possible list elements in a list. This object is initialized to the maximum list-set-element count when a list structure is created.

List-Entry Count (LEC)

An object or field that specifies the number of list entries currently in the list.

List-Entry-Count Limit (LECL)

An object or field that specifies the maximum number of possible list entries in a list. This object is initialized to the maximum list-set-entry count when a list structure is created.

List-State-Transition Count (LSTC)

An object or field that specifies the number of empty to not-empty list-state transitions that have occurred.

User List Control (ULC)

A field per list defined by the user.

List-Monitor Table

The list-monitor table contains information used to process the list-notification vector of each user who has registered interest in the state transitions of the list.

The list-monitor table is a sequence of objects, called list-monitor-table entries.

The number of list-monitor-table entries is determined when the table is created and is equal to the maximum number of list-structure users. The list-monitor-table entries are numbered from zero to the user-identifier limit.

Each list-monitor-table entry has a list-monitoring-active-bit object, a list-notification-request-type object and a list-notification-entry-number object.

List-Monitoring-Active Bit (LMAB)

An object or field that specifies whether the user associated with the list-monitor-table entry is monitoring the list-state transitions of the list.

When a user is not monitoring a list, all previously issued list-notification commands on behalf of the associated user for this list are complete.

List-Notification-Request Type (LNRT)

An object or field that indicates whether the list-notification-vector summaries are to be updated when an empty to not-empty state transition occurs on a monitored list.

List-Notification-Entry Number (LNEN)

An object or field that specifies a list-notification-vector entry.

List-Entry Controls

There is a list-entry-controls object for every list entry within a structure. The list-entry controls are initialized when a list entry is created and are deleted when the list entry is deleted.

The list-entry controls are summarized in the following table.

| List-Entry Controls | Acronym |
| --- | --- |
| Data-list-entry size | DLES |
| List-entry identifier | LEID |
| List-entry key/list-entry name | LEK/LEN |
| List number | LN |
| Version number | VN |

Data-List-Entry Size (DLES)

An object or field that specifies the size of the data list entry.

List-Entry Identifier (LEID)

An object or field that designates the list entry. A list-entry identifier is unique to a list set and is assigned by the SES.

List-Entry Key (LEK)

An object or field that partially designates the position of the list entry in the list.

List-Entry Name (LEN)

An object or field that fully designates the position of the list entry in the list set. A list-entry name is unique to a list set at any particular instant and is provided by the program.

List Number (LN)

An object or field which designates the list that the list entry is in.

Version Number (VN)

An object or field that is conditionally compared and conditionally updated. The version number is initialized to zero when a list entry is created.

Lock Table

The lock table is a sequence of objects, called lock-table entries. The number of lock-table entries is determined when the table is created. The lock-table entries are numbered from zero to the lock-table-entry count less one. For a specific lock table, the entries have one size which is a power of 2 in the range of 1 to the maximum lock-table-entry size. The size of the largest lock table is limited by the free space and the size of all the controls required to support the list structure.

Each lock-table entry has a global-lock-manager object and an optional local-lock-managers object.

A lock-table entry whose size is one byte has only a global-lock-manager object. When a lock-table-entry size is greater than one byte, the leftmost byte is the global-lock-manager object, and the remaining bytes form the local-lock-managers object. Lock tables with an entry size of one byte do not support local-lock managers. Lock tables with an entry size of at least two bytes do support local-lock managers.

The global-lock-manager object of a lock-table entry contains a field called a user identifier.

The local-lock-managers object of a lock-table entry contains a string of local-lock bits, where each bit represents a user identifier.

The lock-table objects have a value of zero when the table is allocated and may be modified by subsequent commands.

List Set

The list set is a sequence of objects, called lists. The number of lists is determined when a list set is created. The lists are numbered from zero to the list count less one.

List

A list is a sequence of objects, called list entries. The number of possible entries is determined when the list structure is created.

A list entry may also act as a retry-data block.

The relative position of a list entry in the sequence is determined when the entry is created and may be changed when any list entry is created, deleted, or moved.

A list entry is located by means of a list-entry identifier, list-entry name, or by position. The size of the largest list is limited by the free space and the size of all the controls required to support the list structure.

A list entry has up to two objects: a data list entry and an adjunct list entry, depending on the list-structure type.

A data-list entry consists of from one to MDLES list elements. The data-list-entry size is determined when the data-list entry is written. The adjunct-list-entry size is static.

A list entry exists when it is created and ceases to exist when it is deleted.

LIST STRUCTURE OPERANDS

The storage objects and processes are accessed using commands issued by the program. Each list-structure command has three parts:
A message-command block containing:
  Message header
  Request operands
  Reserved area
A message-response block containing:
  Response descriptor
  Response operands
  Reserved area
An optional data block, depending on the command The command descriptions contain the formats of the message-command blocks, message-response blocks, and data blocks.

This section defines the list-structure operands, except for those operands that are also objects. Operands that are also objects can be found under "Global Objects" or "List Structure Objects",

Comparative Global-Lock Manager (CGLM)

A value that is compared to the global-lock-manager object.

Comparative Version Number (CVN)

A value that is compared to the version-number object.

Current Data Index (CDI)

A value that indexes to the current list-entry name or list-entry identifier in the data block for the delete-list-entries command.

Data-Block Size (DBS)

A value that specifies the size of the data block.

Delete-Entries-Locator Type (DELT)

A value that indicates whether a list entry is located by list-entry identifier or list-entry name and whether or not the list numbers are compared for the delete-list-entries command.

Delete-List-Entries Count (DLEC)

A value that specifies the number of deleted list entries.

Direction (DIR)

A value that indicates how the positions of the list entries are numbered relative to a designated position. The direction is either left to right, or
right to left.

Entry-to-Element Ratio (ETELR)

A field consisting of two unsigned binary integers that specify the target for the relative number of list entries to list elements possible in the list set.

The integer specified in the first field divided by the sum of the two numbers represents the fraction of the total of the maximum list-set-element and the maximum list-set-entry count that consists of list entries. The integer specified in the second field divided by the sum of the two numbers represents the fraction of the total of the maximum list-set-element and the maximum list-set-entry count that consists of list elements associated with data list entries and retry-data blocks.

Ending Data Index (EDI)

A value that indexes to the last list-entry name or list-entry identifier in the data block for the delete-list-entries command.

Type (ELT)

A value that indicates how a list entry is located for a read, replace, or delete operation, or as the source of a move operation, and whether list-number comparison is requested. The list entry is located by list-entry identifier, list-entry name, unkeyed position or keyed position.

For a create or the target of a move operation, the target list-entry position is located by keyed position when the entries are keyed, or by unkeyed position when the entries are not keyed.

Key-Request Type (KRT)

A value that indicates how a keyed list entry is located when an entry is replaced, moved, read or deleted. The type determines the relationship between the list-entry-key object and the list-entry-key operand.
00 Equals list-entry-key operand
01 Less than or equal to the list-entry-key operand
10 Greater than or equal to the list-entry-key operand
11 Invalid The key-request type is ignored when the entry-locator type is ignored or when the entries are not located by list-entry key.

List-Control Type (LCT)

The list-control type specifies either (1) the list-element-count or list-entry-count limit is written, depending on the counter indicator or (2) the user list control, both or neither are written.

List-Entry Type (LET)

A value that indicates whether data list entries, adjunct list entries, or both are read or replaced upon normal completion of the command execution.

Local-Lock Managers (LLM)

A value which identifies users with local interest in the lock-table entry.

Local-Lock Bit (LLB)

A value that is written to a local-lock manager.

Lock-Request Type (LRT)

A value that indicates the type of lock request. The lock request type specifies
(1) that No lock process is requested,
(2) to compare the global-lock managers,
(3) to replace the global-lock manager,
(4) to replace a local-lock manager,
(5) to replace the global-lock and local-lock managers.

Lock-Table-Entry Number (LTEN)

A value that specifies an entry in a lock table.

Move-Entry-Locator Type (MELT)

A value that indicates which key is used when a keyed list entry is moved.
The move-entry-locator type specifies whether
The target key is the LEK in the list entry or the TLEK in the MCB.

Read-List-Entries Count (RLEC)

A value that specifies the number of list entries read.

Read-List Type (RLT)

A value that indicates whether list-entry controls, data, list entries, adjunct list entries, or any combination are read upon normal completion of the command execution.

Response Code (RC)

The response code indicates the result of executing a list command.

Restart Token (RT)

A value that controls the reading or deleting of list entries on the read-list-set and delete-list-set commands.

Retry Index (RX)

A VALUE that designates either a particular retry buffer or none.

Retry Version Number (RVN)

A value that specifies the version number stored in the retry buffer.

Starting Data Index (SDI)

A value that indexes to the first list-entry name or list-entry identifier in the data block for the delete-list-entries command.

Target Direction (TDIR)

A value that indicates how the positions of the list entries are numbered relative to a designated target position for a moved list entry. The target direction is either left to right or right to left.

Target List-Entry Key (TLEK)

A value that partially specifies the targeted position to which a list entry is moved.

Target List Number (TLN)

A value that designates the list to which a list-entry is moved.

User Identifier (UID)

A value that identifies a user.

When the lock-request type specifies global-lock-manager and local-lock-managers replacement, the user identifier specifies a global-lock manager. When the lock-request type specifies global-lock-manager replacement, the user identifier specifies a global-lock manager and, when local-lock managers exist, it also specifies a local-lock manager. When the lock-request type specifies local-lock-manager replacement, The user identifier specifies a local-lock manager.

Version-Request Type (VRT)

A value that indicates the type of version-number request to (1) compare the version numbers or (2) to increment, decrement, or replace the version number, or both, or neither.

Write-Request Type (WRT)

A value that indicates the type of write request. The writer-request type specifies
(1) to replace a list entry,
(2) to Create a list entry, or
(3) to replace or create a list entry.

LIST STRUCTURE PROCESSES

The following processes may be invoked by the SES list-structure commands. The set of processes invoked by a command are listed in the command description.

Allocating a List Structure

The user structure control is updated on the allocate-list-structure command. A list structure is created on the first successful invocation of the allocate-list-structure command for a structure that does not already exist. A list structure is initially allocated after one or more successful invocations of the allocate-list-structure command. These operations are referred to generically as list-allocation processes.

Creating a List Structure

When a list structure is created, the list-structure type determines the attributes of the created structure. The list-structure type has indicators for each of the following: counters, locks, data, adjunct, name, and key.

When the counter indicator in the list-structure type specifies that the list-entry count and list-entry-count limit are defined and allocation is successful, the list controls for each list contain a list-entry count and a list-entry-count limit. When the counter indicator in the list-structure type specifies that the list-element count and list-element-count limit are defined and allocation is successful, the list controls for each list contain a list-element count and a list-element-count limit.

When the lock indicator in the list-structure type specifies that a lock table is created and allocation is successful, a lock table is created with a width as specified by the lock-table-entry characteristic and a length as specified by the lock-table-entry count.

When the data indicator in the list-structure type specifies that list entries have data and allocation is successful, storage is allocated for the creation of list elements. The size of the list elements is specified by the list-element characteristic.

When the adjunct indicator in the list-structure type specifies that list entries have adjunct and allocation is successful, each list entry created in the structure has an adjunct list entry.

When the name indicator in the list-structure type specifies that the list entries have names and allocation is successful, each list entry created in the structure has a list-entry name associated with it.

When the key indicator in the list-structure type specifies that the list entries have keys and allocation is successful, each list entry created in the structure has a list-entry key associated with it.

When a list structure is created, (1) the free-space and free-control-space global controls are updated, (2) the appropriate field in the structure-identifier vector is set, and (3) the list-structure and list controls are initialized.

Deallocating a List Structure

When a list structure is deallocated, the storage is freed, the free-space and free-control-space global controls are updated, the appropriate field in the structure-identifier vector, and all the list-monitoring-active objects are reset.

Attaching a List-Structure User

A list-structure user is attached by means of the attach-list-structure-user command.

When a list-structure user is attached, the user controls are initialized, the appropriate field in the user-identifier vector is updated, and the user is placed in the attached state.

Detaching a List-Structure User

A list-structure user is detached after one or more successful invocations of the detach-list-structure-user command.

When a list-structure user is detached, the list-monitoring-active object has been updated in all the list-monitor-table entries associated with the user. The user controls are deleted and the assigned field in the user-identifier vector is updated.

The list-monitoring-active bit is updated only after all list-notification commands issued to the associated list and user are complete.

Comparing Global-Lock Managers

Global-lock-manager comparison always occurs before a lock-table entry is written or may occur before a list entry is created, replaced, read, moved or deleted, depending on the command and lock-request type.

The global-lock-manager object is compared with the comparative-global-lock manager specified. When they match, the global-lock-manager comparison succeeds, and the command continues. When they do not match, the global-lock-manager comparison fails, and an indicative response code is returned.

Comparing Local-Lock Managers

Local-lock-manager comparison may occur before a lock-table entry is written or before a list entry is created, replaced, read, moved or deleted, depending on the command code and lock-request type.

There are two lock-request types that cause local-lock-manager comparison: global-lock-manager replacement, and local-lock-manager replacement.

When a local-lock-manager object exists and a global-lock-manager replacement is requested, the local-lock-manager-object value is ANDed with a mask of all ones except for the local-lock bit corresponding to the user identifier specified. This ANDed value is then compared with zero. When they match, the local-lock-manager comparison succeeds. When they do not match, the local-lock-manager comparison fails.

When a local-lock-manager object exists and a local-lock-manager replacement is requested, the local-lock bit corresponding to the user identifier specified is compared with the local-lock-bit value specified. When they match, the local-lock-manager comparison fails. When they do not match, the local-lock-manager comparison succeeds.

When the local-lock-manager comparison fails, an indicative response code is returned.

Writing a Lock-Table Entry

One or both of the objects contained within a lock-table entry may be replaced, depending on the lock-request type specified.

A global-lock manager may be replaced when a lock-request type specifies to replace the global-lock-manager or to replace the global-lock and local-lock managers and the global-lock-manager comparison succeeds.

One or more local-lock managers are replaced when a lock-request type specifies to replace a local-lock-manager or to replace the global-lock and local-lock managers and the global-lock-manager comparison succeeds.

Replacing a Global-Lock Manager

The global-lock-managers are compared and the local-lock-managers may be compared when global-lock-manager replacement is requested.

When the global-lock-manager comparison succeeds, the global-lock manager may be replaced with the user identifier specified, regardless of whether or not the local-lock-manager comparison succeeds.

Replacing a Local-Lock Manager

The global-lock-managers and local-lock-managers are compared when local-lock-manager replacement is requested.

When the global-lock-manager comparison succeeds, the local-lock bit corresponding to the user identifier specified may be replaced with the local-lock-bit value specified, regardless of whether or not the local-lock-manager comparison succeeds.

Replacing the Global-Lock and Local-Lock Managers

The global-lock-managers are compared when global-lock and local-lock-managers replacement is requested.

When the global-lock-manager comparison succeeds, the global-lock manager may be replaced with the user identifier specified and the local-lock managers are replaced with the local-lock managers specified.

Locating a List Entry or List-Entry Position

The designated list entry is the first entry relative to the designated position before an entry is deleted, when an entry is read, replaced or moved, or after an entry is created. The designated position is specified (1) by an unkeyed position, (2) by a keyed position, (3) by a list-entry identifier, or (4) by a list-entry name, depending on the entry-locator type specified and the type of structure allocated.

A list entry is located by unkeyed position when an entry-locator type specifies locate by unkeyed position or an unkeyed list entry is created or moved; that is, the designated position is specified by means of a list number and a direction. A list entry is located by keyed position when the list entries are keyed and an entry-locator type specifies locate by keyed position or a keyed list entry is created or moved; that is, the designated position is specified by means of a list number, direction, and a list-entry key. A list entry is located by list-entry identifier when an entry-locator type specifies locate by list-entry identifier; that is, the designated position is the position of the identified list entry. A list entry is located by list-entry name when the list entries are named and an entry-locator type specifies locate by list-entry name; that is, the designated position is the position of the named list entry.

A list entry has a position relative to the designated position. When a list entry is created, moved, or deleted, the relative positions of the successive list entries are changed. In these cases, the first entry is the designated list entry and successive entries are determined by the direction specified.

Regardless of how a list entry is located, when a left-to-right direction is specified, the last entry is the rightmost entry in the list, and when a right-to-left direction is specified, the last entry is the leftmost entry in the list.

When a list entry is located by list-entry identifier, the designated list entry is the identified list entry.

When a list entry is located by list-entry name, the designated list entry is the named list entry.

When a list entry is located by unkeyed position and a left-to-right direction is specified, the designated list entry is the leftmost entry in the list. When a list entry is located by unkeyed position and a right-to-left direction is specified, the designated list entry is the rightmost entry in the list.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a left-to-right direction is specified, then the designated source list entry is the leftmost entry with a key equal, with the largest key less than or equal, or with the smallest key greater than or equal to the specified list-entry-key request operand.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a right-to-left direction is specified, then the designated list entry is the rightmost entry with a key equal, with the largest key less than or equal, or with the smallest key greater than or equal to the specified list-entry-key request operand.

When (1) a list entry is located by keyed position, (2) entry creation or movement is requested, (3) a list entry with an equal key exists on the list, (4) a left-to-right direction is specified, then the designated target position is the position of the leftmost entry with the same key.

When (1) a list entry is located by keyed position, (2) entry creation or movement is requested, (3) a list entry with an equal key exists on the list, (4) a right-to-left direction is specified, then the designated target position is the position of the rightmost entry with the same key.

When (1) a list entry is located by keyed position, (2) entry creation or movement is requested, and (3) all entries on the list have a key greater than the specified key, the designated target position is the leftmost position in the list.

When (1) a list entry is located by keyed position, (2) entry creation or movement is requested, (3) at least one list entry on the list has a key less than the specified key, and (4) there is no list entry in the list that matches the specified key, then the designated target position is the first position after the rightmost entry with a key less than the specified list-entry key in the list.

When a list entry is located by list-entry identifier or by list-entry name, the designated position exists when the list entry exists.

When a list entry is located by unkeyed position, the designated position exists when the list exists.

When a list entry is located by keyed position and entry creation or movement is requested, the designated target position exists when the list exists.

When a list entry is located by keyed position and entry creation is not requested, the designated position exists when a list entry in the list has a key that is equal, greater than or equal, or less than or equal to the specified list-entry key in the list, depending on the key-request type.

When the designated position does not exist, an indicative response code is returned.

Comparing List Numbers

When the of the entry-locator type specifies list-number comparison and a list entry is not created, a list-number comparison is requested.

When list-number comparison is requested, the list-number object is compared with the list number specified. If they do not match, the list-number comparison fails, and an indicative response code is returned.

Comparing Counts

There are three sets of counts that are compared, depending on the process requested: the list-set-entry counts, the list-set-element counts, and the list entry counts or list-element counts, depending on the count indicator.

Comparing List-Element Counts

The list-element-count-limit object is compared with the list-element-count operand whenever a list entry is written or moved and the count indicator in the list-structure type is one. If the sum of the list-element count and the number of additional list elements required exceeds the list-element-count limit, the list is full. When the list is full and a write or move operation is requested, an indicative response code is returned.

The list-element-count limit or list-entry-count limit is updated on a write-list-controls command, depending on the list-control type.

Comparing List-Entry Counts

The list-entry-count-limit object is compared with the list-entry-count operand whenever a list entry is created or moved and they exist. A list is full when the number of list entries created matches or exceeds the list-entry-count limit. When the list is full and a create or move operation is requested, an indicative response code is returned.

Comparing List-Set-Element Counts

The maximum list-set-element-count object is compared with the list-set-element-count object whenever a data list entry is written. If the sum of the list-set-element count and the number of additional list elements required exceeds the maximum-list-set-element count, the list set is full. When the list set is full, and list-entry creation or retry-data block creation is requested, an indicative response code is returned.

Comparing List-Set-Entry Counts

The maximum list-set-entry-count object is compared with the list-set-entry-count object whenever a list entry is created. A list set is full when the number of list entries created and not deleted matches the maximum list-set-entry count. When a list set is full and list-entry creation or retry-data block creation is requested, an indicative response code is returned.

Updating Counts

There are three types of counts that are updated, depending on the process requested: the list-set-entry count, the list-set-element count, and the list-entry count or list-element count, depending on the count indicator.

Updating the List-Element Counts

The list-element counts are updated whenever a list entry is created, deleted, or moved to another list or replaced and the number of list elements associated with the list entry is changed or a retry-data block is created or deleted. When the list entry is also the retry-data block, the count is at most incremented or decremented by the number of list elements associated with the list entry.

Updating the List-Entry Counts

The list-entry counts are updated whenever they exist and a list entry is created, deleted, or moved to another list.

Updating the List-Set-Element Count

The list-set-element count is updated whenever a list entry is created, deleted, or replaced and the number of list elements associated with the list entry is changed or a retry-data block is created or deleted. When the list entry is also the retry-data block, the count is at most incremented or decremented by the number of list elements associated with the list entry.

Updating the List-Set-Entry Count

The list-set-entry count is updated whenever a list entry is created or deleted.

Comparing Version Numbers

Version numbers may be compared when an entry is replaced, read, moved, or deleted, depending on the version-request type specified. When a version-request type specifies to compare the version numbers, the version-number object is compared with the comparative-version-number request operand. When they match, processing continues. When they do not match, the version-number comparison fails, and an indicative response code is returned.

Updating a Version Number

A version number may be updated when an entry is created, replaced, read, or moved, depending on the version-request type specified.

When a version-request type of specifies to decrement the version number, the version number is decremented by one. When a version-request type specifies to increment the version number, the version number is incremented by one. When a version-request specifies to replace the version number, the version-number object is set to the version-number request operand.

Writing a List Entry

A list entry may be written on a write-list-entry or a write-and-move-list-entry command. A list entry is written when an entry is created or replaced.

When a list entry is created, the data and adjunct indicators within the list-structure-type object are used to determine whether or not to write the data or adjunct list entry, or both. When a list entry is replaced, the data and adjunct indicators within the list-entry-type operand are used to determine whether or not to write the data or adjunct list entry, or both.

When the data indicator specifies that the list entries have data, the data list entry is written from the data block. When the adjunct indicator specifies that the list entries have adjunct, the adjunct list entry is written from the adjunct-list-entry-value request operand.

When the data list entry is replaced and the data-list-entry-size operand is smaller than the data-list-entry-size object, the data-list entry is contracted to the new size, the data block is stored in the data-list entry, and the data-list-entry-size object in the list-entry controls is updated with the value of the data-list-entry-size operand. When the data list entry is replaced and the data-list-entry-size operand is larger than the data-list-entry-size object, the data-list entry is expanded to the new size, the data block is stored in the data-list entry, and the data-list-entry-size object in the list-entry controls is updated with the value of the data-list-entry-size operand.

Creating a List Entry

List-entry creation is requested on a write-list-entry command, depending on the write-request type specified.

When a write-request type specifies to create a list entry, list-entry creation is unconditionally requested. When a write-request type specifies to replace or create a list entry, list-entry creation is conditionally requested; that is, the list-entry creation is requested when the designated list entry does not exist.

When the list set and list is not full and list-entry creation is requested, a list entry may be created. When a list entry is created, the list-set-entry count and when it exists, the associated list-entry count are each incremented by one. When a list entry is created, the list-set-element count and when it exists, and the associated list-element count are each increased by the value of the data-list-entry size.

A list entry is created at the first entry position relative to the designated position, and the relative position of all succeeding entries is increased by one.

Replacing a List Entry

A list entry may be replaced on a write-list-entry command.

When a write-request type specifies to replace a list entry or to replace or create a list entry and the designated list entry exists, the list entry may be replaced.

When a list entry is replaced, the list-set-element count and when it exists, the associated list-element count are each increased or decreased by the change in the data-list-entry size.

The position of an entry is not affected when it is replaced.

When a write-request type specifies to replace a list entry and the designated list entry does not exist, an indicative response code is returned.

Reading a List Entry

A list entry may be read on a read-list-entry, move-and-read-list-entry, or read-and-delete-list-entry command, and one or more list entries may be read on a read-list or read-list-set command.

When the list-entry type specifies data list entries, one or more data list entries may be read into the data area, depending on the command executed. When the list-entry type specifies adjunct list entries, one adjunct list entry may be read into the adjunct-list-entry-value response operand, or one or more adjunct list entries are read into the data area, depending on the command executed.

When a read-list or read-list-set command is executed, the adjunct or data list entries are always read into the data area. Otherwise, when any other command that does a read operation is executed, the adjunct list entry is read into the response operand.

The position of an entry is not affected by a read operation.

Moving a List Entry

A list entry may be moved on a move-list-entry, a write-and-move-list-entry, or a move-and-read-list-entry command. List entries may be moved between lists or to the same list within a list set.

A list entry is moved from the first entry position relative to the designated position, and the relative position of all succeeding entries is decreased by one. A list entry is moved to the first entry position relative to the targeted position, and the relative position of all succeeding entries is increased by one.

When a list entry is moved from one list to another and list-entry counts exist, the list-entry count of the source list is decremented by one and the list-entry count of the target list is incremented by one.

When a list entry is moved from one list to another and list-element counts exist, the list-element count of the source list is decreased by the value of the data-listentry size and the list-element count of the target list is increased by the same amount.

Deleting a List Entry

A list entry may be deleted on a delete-list-entry or a read-and-delete-list-entry command and one or more list entries may be deleted on a delete-list-set or delete-list-entries command.

An entry is deleted at the first entry position relative to the designated position, and the relative position of all succeeding entries is decreased by one.

When a list entry is deleted, the list-set-entry count and when list-entry counts exist, the associated list-entry count are each decremented by one.

When a list entry is deleted, the list-set-element count and when list-element counts exist, and the associated list-element count are each decreased by the value of the data-list-entry size.

Writing the Retry Buffer

When the retry index specifies a retry buffer, the retry-version-number request operand and all the response operands except for the response descriptor are stored in the retry-information portion of the retry buffer specified by the retry index. When the retry index specifies a retry buffer and a data list entry is read, the data list entry is also stored in the retry-data-block portion of the retry buffer specified by the retry index.

Notifying a List Monitor

Processing of a list-notification command consists of three operations; message-path selection, initiation, and completion.

When a list-state transition occurs, one or more list-notification commands are initiated for each user who is monitoring the list to the system which attached the user. All the list-notification commands initiated as a result of a list-state transition are initiated before the command that caused the list-state transition is completed.

The list-notification command provides the information necessary for the system to update one list-notification entry and, when requested, the associated list-notification summaries, to reflect the new list state.

A user becomes a list monitor by registering with the list by means of the register-list-monitor command. A user ceases to be a list monitor by deregistering from the list by means of the deregister-list-monitor command or by detaching from the list structure by means of the detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

This section defines the list-structure operands for the list notification command.

| List-Notification Operands | Acronym |
|---|---|
| Non-empty state change | NESC |
| List-notification-entry number | LNEN |
| List-notification token | LNT |

| List-Notification Operands | Acronym |
|---|---|
| Summary update | SU |

Non-empty State Change (NESC)

A value that indicates that the list transition from the associated list notification bit vector entry was either an empty to not-empty transition (value is one) or a not-empty to empty transition (value is zero).

List-Notification-Entry Number (LNEN)

An object or field that specifies a list-notification-vector entry.

List-Notification Token (LNT)

A value that specifies a list-notification vector to the system.

Summary Update (SU): termed LNRT

A value that indicates whether the list-notification-vector summaries are to be updated when an empty to not-empty state transition occurs on a monitored list.

List structure commands

This section summarizes the list structure commands that are supported by the SES facility 110. List structure commands are direct commands which are communicated from the CPC to the message processing function of the SES via the Send Message CPU instruction. List structure commands are categorized as follows:

Structure commands which allocate, read, and write list structures, list structure controls, and list controls.

User commands which allow a user (program) to identify itself to the SES, and to register as a monitor of specific lists in the SES.

Lock only commands which support read, write, and clear operations on lock table objects.

Single-list-entry commands which support read, write, move and delete operations on one list entry object.

Multiple-list-entry commands, which support read and delete operations on multiple list objects/entries.

Structure commands

The structure commands are:
Allocate-list-structure (ALST),
Deallocate-list-structure (DLST),
Read-list-structure-controls (RLSC),
Read-list-controls (RLC), and
Write-list-controls (WLC).

ALST Command

The ALST command creates (allocates) a list structure.

The allocate-list-structure command creates a list structure when the structure identifier is not assigned and there is sufficient free space and sufficient free control space available in the SES for creating the requested lock-table entries, lists and associated controls, and at least one list entry when a list set is requested.

The allocate-list-structure command continues the initial allocation of a list structure when the structure identifier is assigned and initial allocation of the structure has not completed.

When the structure is allocated, a checkpoint is established and the maximum list-set-entry count, maximum list-set-element count, allocated structure size and an indicative response code are returned in the response operands.

When a model-dependent time period has elapsed before the allocation process is completed, the maximum list-set-entry count, maximum list-set-element count, allocated structure size and an indicative response code is returned in the response operands.

When insufficient free control space but sufficient free space is available in SES for the structure, an indicative response code is returned in the response operand.

When insufficient free space is available in SES for the structure, an indicative response code is returned in the response operand.

When the initial allocation of the list structure has not completed, the initial allocation is continued.

DLST Command

The DLST command deallocates the list structure associated with the specified structure identifier. The designated list structure is deallocated and an indicative response code is returned in the response operand. When a model-dependent time period has elapsed before the deallocation process is completed, an indicative response code is returned in the response operand.

RLSC Command

The RLSC command returns (in the response operands) the list-structure controls associated with the specified structure identifier.

RLC Command

The RLC command returns (in the response operands) the list controls associated with the specified structure identifier and list number.

WLC Command

The WLC command writes/updates the list controls associated with the specified structure identifier and list number.

The write-list-controls command writes the list controls, depending on the list-control type.

User commands

The user commands are:
Attach-list-structure-user (ALSU),
Detach-list-structure-user (DLSU),
Register-list-monitor (RLM),
Deregister-list-monitor (DLM), and
Read-user-controls (RUC).

ALSU Command

The ALSU command executes the attachment process.

Figure 13:
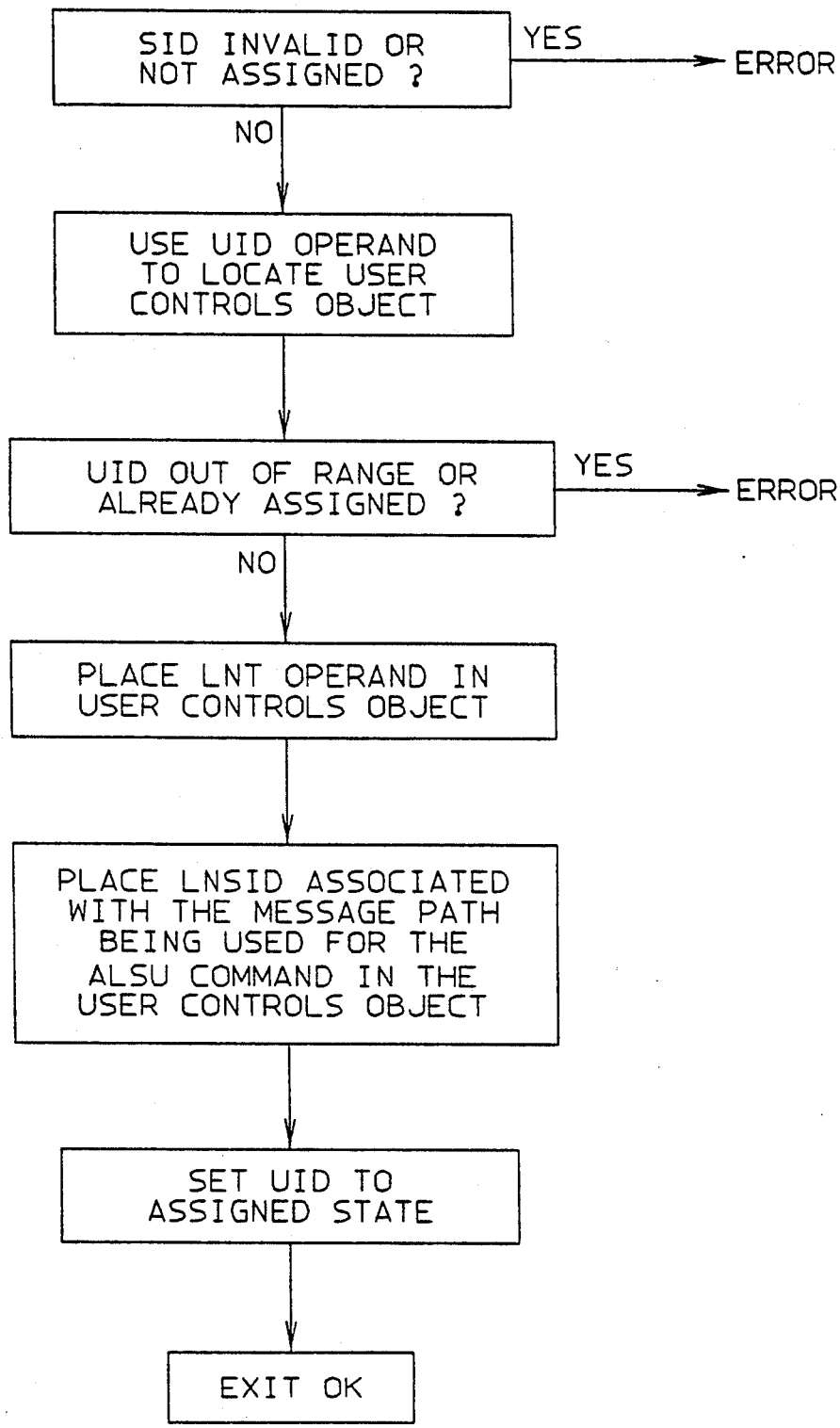
FIG. 13 is a flowchart illustrating the Attach List Structure User (ALSU) command.

FIG. 13 is a flowchart showing the process for the ALSU command.

The attach-list-structure-user command attaches the list-structure user.

When the list-structure user is attached, an indicative response code is returned in the response operand.

DLSU Command

The DLSU command completes the detachment process and changes the state of the user identifier 418 to unassigned.

Figure 14:
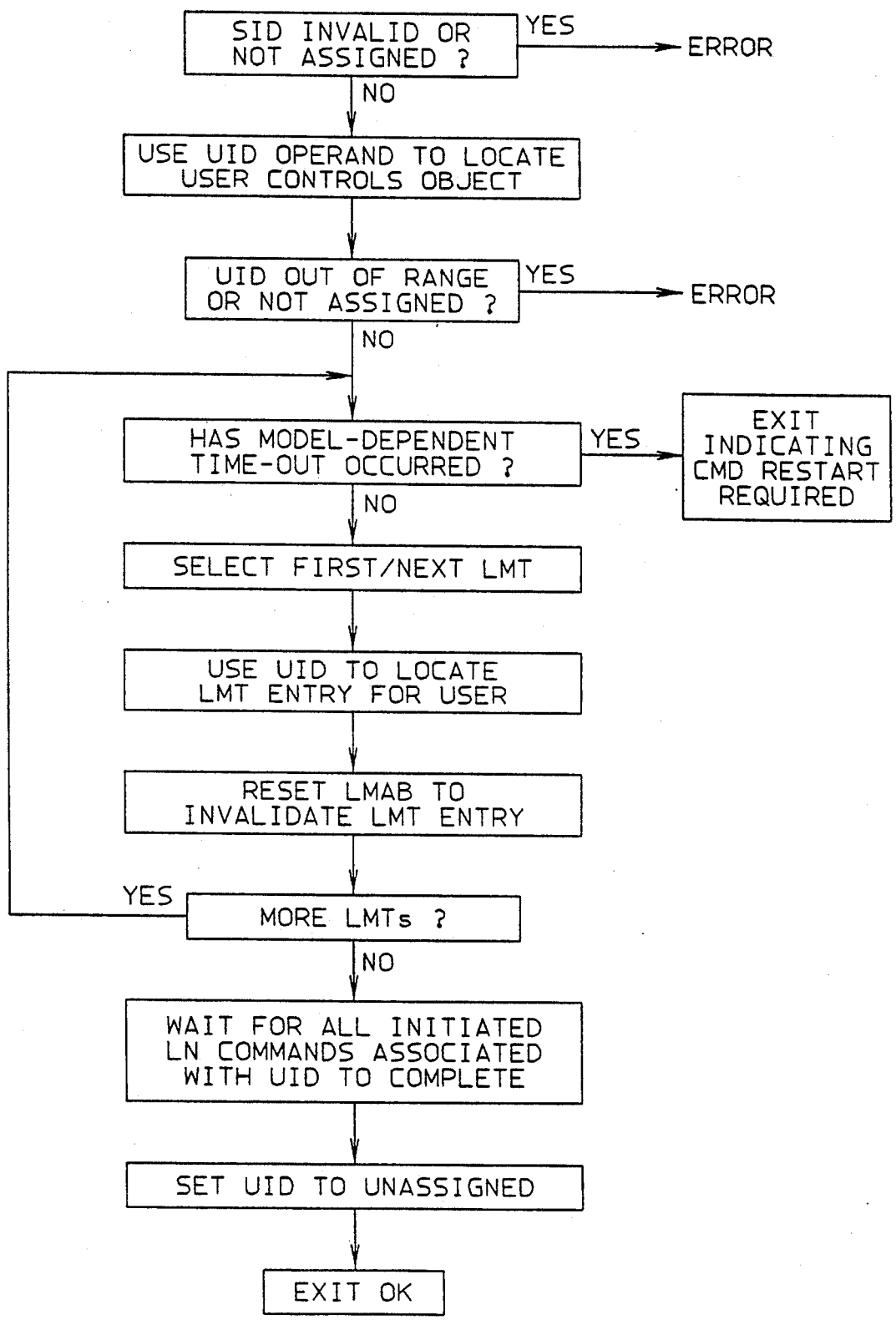
FIG. 14 is a flowchart illustrating the Detach List Structure User (DLSU) command.

FIG. 14 is a flowchart showing the process for the DLSU command.

The detach-list-structure-user command continues detaching the list-structure user.

The detach-list-structure-user command completes detaching the list-structure user when the list-monitoring-active bit of all the list-monitor-table entries associated with the list-structure user is reset. After processing all list monitor tables, the DLSU command waits for all initiated LN commands associated with the list structure user to complete.

The user identifier is placed in the unassigned state.

When the list-structure user is detached, an indicative response code is returned in the response operand.

When the model-dependent time period has elapsed before the detachment process is complete, an indicative response code is returned in the response operand.

RLM Command

Figure 15:
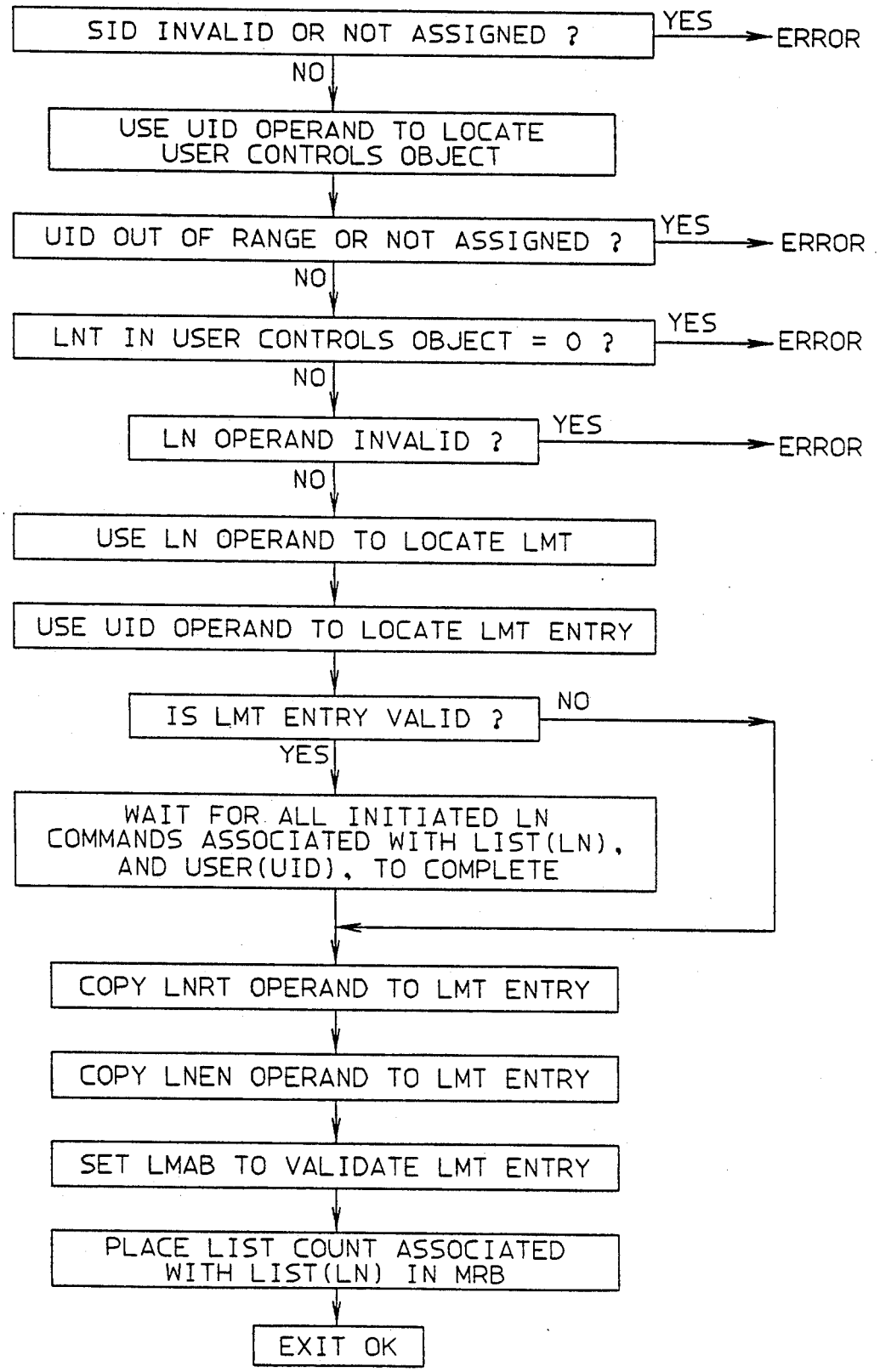
FIG. 15 is a flowchart illustrating the Register List Monitor (RLM) command.

The RLM command registers a list structure user as a list monitor by updating the list monitor table. It is described in FIG. 15.

When the specified list-structure user is attached with a valid list-notification token, the list-monitoring-active field is updated and the list-notification-request type and list-notification entry number are updated in the list-monitor-table entry of the specified list and user, and the list-entry count or the list-element count and an indicative response code are returned in the response operands.

When the specified list-structure user is attached with an invalid list-notification token, an indicative response code is returned in the response operand.

DLM Command

Figure 16:
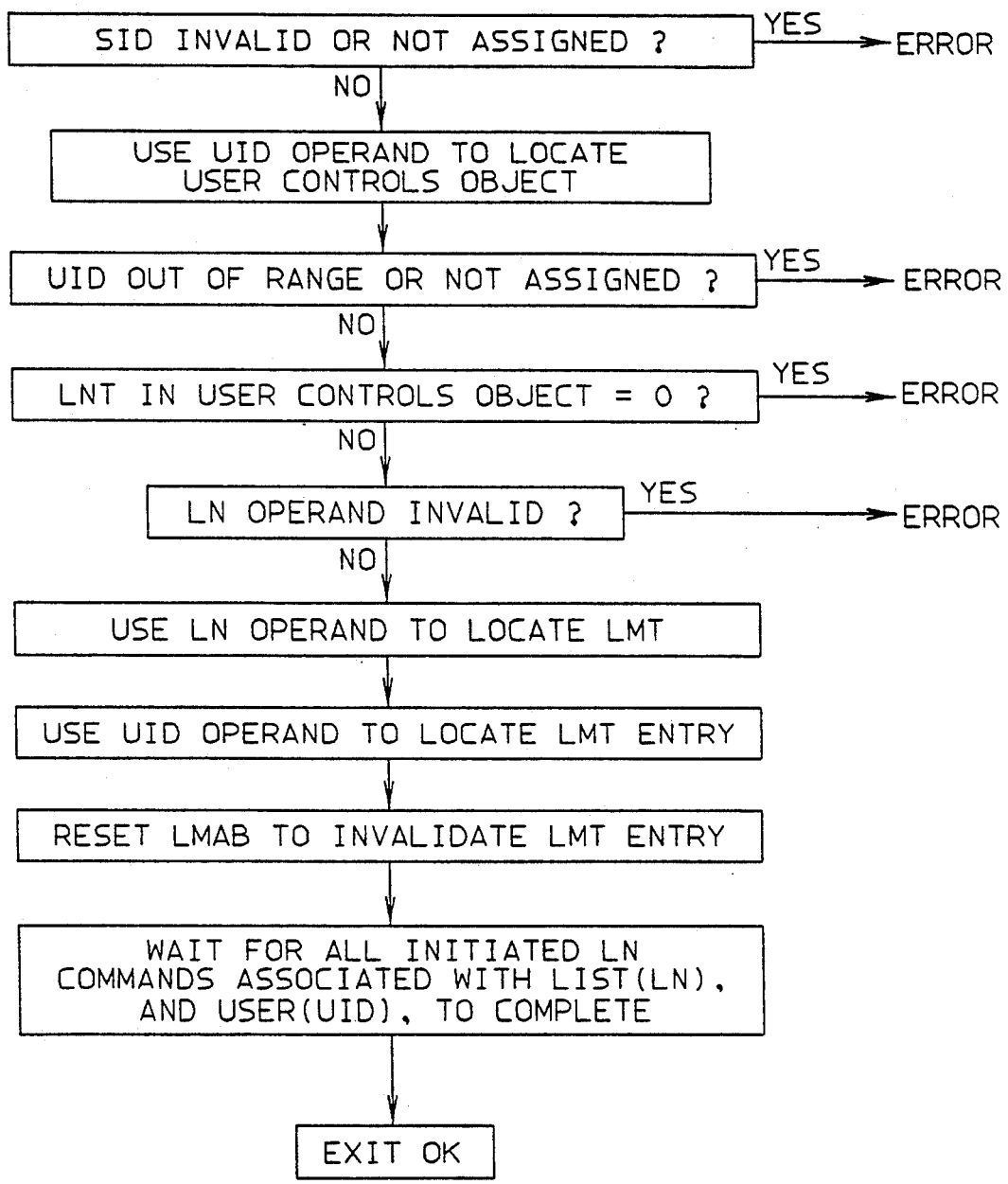
FIG. 16 is a flowchart illustrating the Deregister List Monitor (DLM) command.

The DLM command deregisters a list structure user as a list monitor. It is described in FIG. 16.

The list-monitoring-active field is updated in the list-monitor-table entry of the specified list and user. Then the DLM command waits for all initiated LN commands associated with the list and user to complete. An indicative response code is returned in the response operand.

RUC Command

The RUC command returns the user controls 210 in the response operands.

Lock-only commands

The lock-only commands are:
Read-lock-table-entry (RLTE),
Write-lock-table-entry (WLTE),
Read-next-lock-table-entry (RNLTE), and
Clear-lock-table (CLT).

RLTE Command

The RLTE command returns the lock-table-entry value of the lock-table-entry specified by the structure identifier and lock-table-entry number.

The lock-table-entry value of the lock-table entry specified by the structure identifier and lock-table-entry number and an indicative response code are returned in the response operands.

WLTE Command

The WLTE command compares the global-lock managers and conditionally replaces the global-lock managers, the local-lock managers or both.

When a global-lock manager is replaced and there are no other local-lock managers or when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then an indicative response code is returned in the response operand.

When global-lock manager comparison fails, an indicative response code is returned in the response operand.

RNLTE Command

The RNLTE command conditionally reads the next nonzero lock-table entry.

The read-next-lock-table-entry command scans the lock-table entry starting at the lock-table-entry number specified and proceeds sequentially in ascending lock-table-entry number order until a nonzero entry or the end of the lock table is reached, or a model-dependent time period elapses.

When the end of the lock table is reached without encountering a nonzero entry, the last lock-table-entry number and an indicative response code are returned in the response operands.

When a model-dependent time period has elapsed before the end of the lock table is reached, an indicative response code is returned in the response operand.

When a nonzero lock table entry is reached, the lock-table-entry number, the lock-table-entry value, and response code 2 are returned in the response operands.

CLT Command

The CLT command zeros one or more lock-table entries.

The clear-lock-table command zeros the lock-table entries starting at the lock-table-entry number specified and proceeds sequentially in ascending lock-table-entry-number order until a model-dependent time period elapses or the end of the lock table is reached.

When the end of the lock table is reached before a model-dependent time period has elapsed, an indicative response code is returned in the response operand.

When a model-dependent time period has elapsed before the end of the lock table is reached, the lock-table-entry-number of the next entry in the sequence that has not been cleared and an indicative response code is returned in the response operand.

Single-list-entry commands

The single-list-entry commands are:
Read-list-entry (RLE),
Write-list-entry (WLE),
Move-list-entry (MLE),
Delete-list-entry (DLE),
Write-and-move-list-entry (WMLE),
Move-and-read-list-entry (MRLE),
Read-and-delete-list-entry (RDLE),

RLE Command

The RLE command conditionally compares the list numbers, compares the version numbers, conditionally updates the version number with compares the global-lock managers, compares the local-lock managers writes the lock-table entry, returns the designated list-entry controls and list entry values, and conditionally updates the retry buffer.

The list entry is located and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be read, all of these processes, when requested, must succeed. In order for a lock-table entry to be written, all of these processes except for local-lock manager comparison, when requested, must succeed.

The retry buffer is written, depending on the retry index.

When a list entry is read, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock mangers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated-list-entry controls and an indicative response code are returned in the response operands.

When the designated list entry exists but the requested list-number comparison fails, the designated-list-entry controls and an indicative response code of are returned in the response operands.

When the designated list entry does not exist, an indicative response code is returned in the response operand.

WLE Command

The WLE command conditionally compares the list numbers, compares the list-set-entry counts, compares the list-entry counts or list-element-counts, compares the version numbers, conditionally updates the version number, compares the global-lock managers, compares the local-lock managers, writes the lock-table entry, replaces or creates the designated list entry, returns the designated list-entry controls, and conditionally updates the retry buffer.

The designated list entry or position is located and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written, these processes, when requested, must succeed. In order for a lock-table entry to be written, all of these processes except for local-lock manager comparison, when requested, must succeed.

When a list entry is created and a list-state transition results, the list monitors are notified. The list-notification command does not have to complete before the write-list-entry command completes.

The retry buffer is written, depending on the retry index.

When a list entry is written, the list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code of are returned in the response operands.

When the designated list entry does not exist, an indicative response code is returned in the response operand.

When the list-entry name already exists and list-entry creation is requested, an indicative response code is returned in the response operand.

MLE Command

The MLE command conditionally compares the list numbers, compares the list-entry counts or list-element-counts, compares the version numbers, conditionally updates the version number, compares the global-lock managers, compares the local-lock managers, writes the lock-table entry, moves the designated list entry, returns the designated list-entry controls, and conditionally updates the retry buffer.

The list entry and the designated target position are located, the list-entry counts or list-element counts are compared, and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-list-entry command completes.

The retry buffer is written, depending on the retry index.

When a list entry is moved, the designated-list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

DLE Command

The DLE command conditionally compares the list numbers, compares the version numbers, conditionally replaces the version number with, compares the global-lock managers, compares the local-lock managers, writes the lock-table entry, deletes the designated list entry, returns the designated list-entry controls, and conditionally updates the retry buffer.

The list entry is located and, when requested, the list numbers are compared, the version numbers are compared, or the global-lock managers are compared, or any combination of the preceding processes is performed. When the global-lock managers are compared, the local-lock managers may be compared. In order for a list entry to be deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the delete-list-entry command completes.

The retry buffer is written, depending on the retry index.

When a list entry is deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When the global-lock manager is replaced and there are one or more other local-lock managers, or when a local-lock manager is replaced with the same value, then the lock-table-entry value and an indicative response code are returned in. the response operands.

When the global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

WMLE Command

The WMLE command conditionally compares the list numbers, compares the list-set-entry counts, compares the list-entry counts or list-element-counts, creates or replaces a list entry, compares the version numbers, conditionally updates the version number , compares the global-lock managers, compares the local-lock managers, writes the lock-table entry, moves the designated list entry, returns the designated list-entry controls, and conditionally updates the retry buffer.

The designated list entry or position is located, and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written and moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the write-and-move-list-entry command completes.

The retry buffer is written, depending on the retry index.

When a list entry is written and moved, the list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

When the list-entry name already exists and list-entry creation is requested, an indicative response code is returned in the response operand.

MRLE Command

The MRLE command conditionally compares the list numbers, compares the list-entry counts or list-element-counts, compares the version numbers, conditionally updates the version number, compares the global-lock managers, compares the local-lock managers, writes the lock-table entry, moves the designated list entry, returns the designated list-entry values, returns the designated list-entry controls, and conditionally updates the retry buffer.

The list entry and the designated target position are located, the list-entry counts or list-element counts are compared, and, when requested, the list numbers are compared, the version numbers are compared, the version numbers are updated, or the global-lock managers are compared, or any combination of the preceding processes is performed. When the global-lock managers are compared, the local-lock managers may be compared. In order for a list entry to be moved and read, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-and-read-list-entry command completes.

The retry buffer is written, depending on the retry index.

When a list entry is moved and read, the designated list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response code.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

RDLE Command

The RDLE command conditionally compares the list numbers, compares the version numbers, conditionally updates the version number, compares the global-lock managers, compares the local-lock managers, writes the lock-table entry, deletes the designated list entry, returns the designated list-entry values, returns the designated list-entry controls, and conditionally updates the retry buffer.

The list entry is located and, when requested, the list number is compared, the version numbers are compared, or the global-lock managers are compared, or any combination of the preceding processes is performed. When the global-lock managers are compared, the local-lock managers may be compared. In order for a list entry to be read and deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the read-and-delete-list-entry command completes.

The retry buffer is written, depending on the retry index.

When a list entry is read and deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operand.

When a global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

Multiple-list-entry commands

The multiple-list-entry commands are:
Read-list (RL),
Read-list-set (RLS),
Delete-list-set (DLS), and
Delete-list-entries (DLES).

RL Command

The RL command conditionally compares the list numbers, and the version numbers. It returns the read-list entries count, the list-entry controls of the next list entry, zero or more list-entry values, zero or more list-entry controls, or any combination of the preceding.

Figure 17:
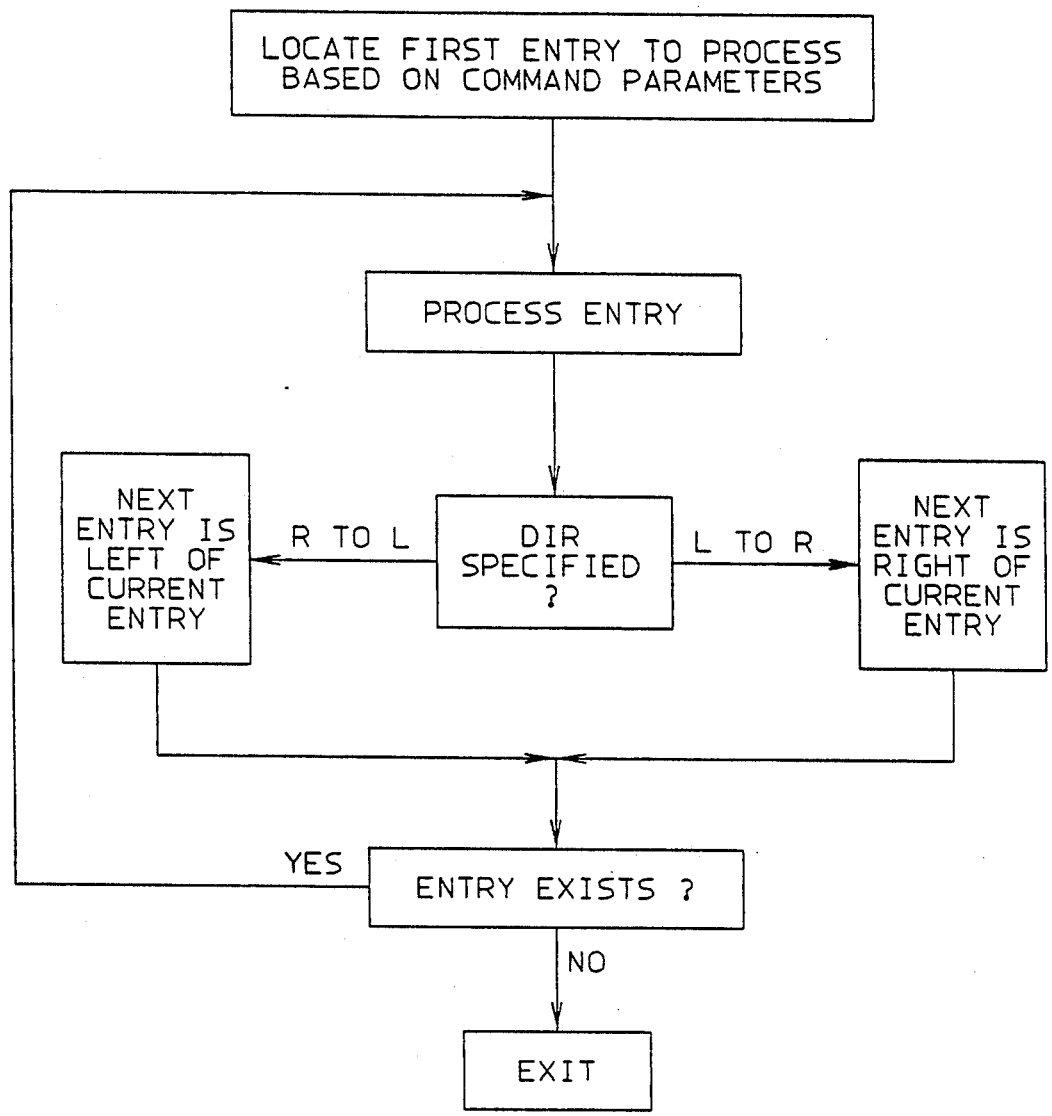
FIG. 17 is a flowchart illustrating the process of scanning for list entries by direction, for multiple list entry commands.

When requested, the list numbers are compared before the first list entry is scanned. (The scanning process is illustrated in FIG. 17.) The list entries are scanned starting at the designated position and proceeding in the direction specified until a model-dependent time period elapses, the data area is filled, or the last list entry is scanned. Each list entry is located and, when requested, the version numbers are compared. In order for any list entries or list-entry controls to be read, the list-number comparison, when requested, must succeed. In order for a particular list entry or list-entry controls to be read, the version-number comparison, when requested, must succeed.

The list-entry controls and adjunct list entry for the first list entry scanned are placed in the message-response block. The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the list-entry controls of the next list entry in the sequence to be scanned and an indicative response code are returned in the response operands.

When the specified data-block size is not large enough to contain the information specified by the read-list type for at least one list entry, an indicative response code is returned in the response operand.

When the designated list entry exists but the requested list-number comparison fails, the designatedlist-entry controls and an indicative response code are returned in the response operands.

When the designated list entry does not exist, an indicative response code is returned in the response operand.

RLS Command

The RLS command conditionally compares the list numbers and the version numbers. It returns the read-list entries count, the restart token, zero or more list-entry values, zero or more list-entry controls, or any combination of the preceding.

The list entries within the list set are scanned starting at the restart token specified until a model-dependent time period elapses, the data area is filled, or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry or list-entry controls to be read, the version-number comparison and list-number comparison, when requested, must succeed.

The list-entry controls and adjunct list entry for the first list entry scanned are placed in the Message Response Block (MRB). The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the restart token, and an indicative response code are returned in the response operands.

When the specified data block size is not large enough to contain the information specified by the read-list type for at least one list entry, an indicative response code is returned in the response operand.

When the restart token is invalid, an indicative response code is returned in the response operand.

DLS Command

The DLS command conditionally compares the list numbers and the version numbers. It returns the delete-list entries count, and the restart token. It deletes zero or more list-entries.

The list entries within the list set are scanned starting at the restart token specified until a model-dependent time period elapses or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-set command completes.

When the last list entry is scanned, the delete-list-entries count equaling the number of list entries deleted and an indicative response code are returned in the response operands.

When a model-dependent time period has elapsed, the delete-list-entries count equaling the number of list entries deleted, the restart token, and response code 1 are returned in the response operands.

When the restart-token operand is invalid, an indicative response code is returned in the response operand.

DLES Command

The DLES command conditionally compares the list numbers and the version numbers. It returns the delete-list entries count, and the current data index. It deletes zero or more list-entries.

The list entries within the list set are scanned starting at the first list entry specified by the starting data index and continuing in the same order as specified in the data block. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-entries command completes.

When the last list entry specified by the ending data index is scanned, the delete-list-entries count equaling the number of list entries deleted and an indicative response code are returned in the response operands.

When a model-dependent time period has elapsed, the delete-list-entries count equaling the number of list entries deleted, the current data index of the next list entry to be scanned, and an indicative response code are returned in the response operands.

When the designated list entry does not exist, the delete-list-entries count equaling the number of list entries deleted, the current data index of the nonexistent list entry, and an indicative response code are returned in the response operands.

The invention claimed is:

1. An apparatus for sharing data among two or more processes executing in one or more Central Electronic Complexes (CEC's), said apparatus comprising:
 a) A structured External Storage (SES) processor connected to at least one of said CEC's and comprising:
  i) data structure means for storing said data, comprising a list structure and a cache structure;
  ii) one or more message processor means for interacting with said data structure means and interacting with a Support Facility (SF) in said one of said CEC's, one of said one or more message processor means comprising registration means for registration of interest in status relating to a data item in said data structure by one of said two or more processes;
 b) Said SF in said one of said CEC's comprising:
  i) vector means for indicating said status relating to a data item in said data item in said data structure;
  ii) a first instruction means for defining said
  iii) a second instruction means for polling said vector means; and
 c) Communication means within said one of said one or more CEC's for communicating messages between said SES and said one of said one or more CEC's.

2. An apparatus for sharing data among two or more processes executing in one or more Central Electronic Complexes (CEC's), said apparatus comprising:
   a) A structured External Storage (SES) processor connected to at least one of said CEC's and comprising:
      i) data structure means for storing said data, comprising one or more data objects;
      ii) two or more message processor means for interacting with said data structure means and interacting with a support facility in said one of said CEC's, to perform a command;
      iii) serialization means accessed by said two or more message processor means for serializing command processing between said two or more message processor means; and
   b) Communication means within said one of said one or more CEC's for communicating messages between said SES and said one of said one or more CEC's.

3. The apparatus of claim 2 in which said support facility in said one of said CEC's comprises means for receiving status notifications from said SES without interrupting processing in said one of said CEC's.

4. The apparatus of claim 2 in which said serialization means comprises update reference interlock means for interlocking access to a single one of said one or more data objects between a fetch and a store reference to said single one of said one or more data objects.

5. The apparatus of claim 4 in which said serialization means further comprises first lock means for serializing access to each one of said one or more data objects among said two or more message processor means.

6. The apparatus of claim 5 in which said first lock means comprises an object lock linked to said each one of said one or more data objects.

7. The apparatus of claim 6 in which said second lock means comprises:
   a) deadlock prevention means for preventing a deadlock condition between two of said two or more message processor means;
   b) lock retention means for retaining the object lock linked to said two or more data objects until said multiple-object command completes.

8. The apparatus of claim 7 in which said deadlock prevention means comprises a lock hierarchy comprising two or more lock hierarchy levels, each of said two or more lock hierarchy levels comprising one or more of said object locks.

9. The apparatus of claim 5 in which said means for serializing further comprises second lock means for serializing access to two or more data objects of said one or more data objects when a multiple-object command, referencing said two or more data objects, is performed.

10. An apparatus for sharing data among two or more processes executing in one or more Central Electronic Complexes (CEC's), said apparatus comprising:
   a) A structure External Storage (SES) processor connected to at least one of said CEC's and comprising:
      i) data structure means for storing said data, comprising one or more data objects and a directory comprising one or more directory elements locating each of said one or more data objects, and a buffer means for receiving an input data object;
      ii) one or more message processor means for interacting with said data structure means, and interacting with a support facility (SF) in said one of said CEC's, to perform a command for one of said one or more processes;
   b) Said SF in said one of said CEC's comprising means for receiving status notifications from said SES without interrupting processing in said one of said CEC's; and
   c) Communications means within said one of said one or more CEC's for communicating messages between said SES and said one of said one or more CEC's.

11. An apparatus for sharing data among two or more processes executing in one or more Central Electronic Complexes (CEC's), said apparatus comprising:
   a) A Structured External Storage (SES) processor connected to at least one of said CEC's and comprising:
      i) data structure means for storing said data, comprising one or more data objects,
      ii) one or more message processor means for interacting with said data structure means, and interacting with a support facility (SF) in said one of said CEC's, to perform a command on behalf of one of said one or more processes;
      iii) forward completion means, operably connected to said one or more message processor means for returning a command completion indication to said one of said one or more processes before final processing of said command by said one or more message processor means, while ensuring that none of said two or more processes will subsequently detect a result inconsistent with said final processing;
   b) Said SF in said one of said CEC's comprising means for receiving status notifications from said SES without interrupting processing in said one of said CEC's; and
   c) Communications means within said one of said one or more CEC's for communicating messages between said SES and said one of said one or more CEC's.

12. The apparatus of claim 11 in which said forward completion means comprises power loss backup means for ensuring power continuity so that said final processing of said command will complete.

13. The apparatus of claim 11 in which said forward completion means comprises interrupt handler means for recovering interrupted command processes and reconstructing damaged data from checkpointed state information, and further comprises a damage indicator accessible by said one or more message processor means to prevent access to said damaged data when said recovering by said interrupt handler means is not successful.

14. The apparatus of claim 13 in which said damage indicator comprises a facility damage indicator and a structure damage indicator.

15. An apparatus for restarting commands in a system complex comprising one or more Central Electronic Complexes (CEC's), each controlled by an operating system and attached to a Structured External Storage (SES) processor by a link, said apparatus comprising:
   a) Command message means for transmitting a command request to said SES from a first program process in a first one of said one or more CEC's, said command request initiating a command process in said SES;
   b) Command message processing means in said SES, for performing said command process;

c) Timeout means in said SES for detecting expiration of a SES model-dependent timeout interval during executing of said command process, and suspending execution of said command process at a point of suspension; and d) reinitiation means in said SES for restarting said command process at said point of suspension at request of a second program process in any of the one or more CEC's.

16. The apparatus of claim 15 in which said timeout means comprises means for obtaining and passing to said first program process, a restart token, and in which said reinitiation means comprises means for receiving said restart token from said first program process.

17. The apparatus of claim 15 in which said SES comprises a directory object comprising more than one directory element, each of said more than one directory elements being sequentially ordered, and being linked to an associated data object; in which said command process comprises a sequential scan of said sequentially ordered directory elements; and in which said restart token comprises a directory element locator means for locating a first sequentially ordered directory element at which said command process was suspended by said timeout means.

18. A method for updating a data structure within a Structured External Storage (SES) processor by a process executing in a Central Electronic Complex (CEC) attached to said SES, said data structure having data entries each located by a directory entry in a directory, said method comprising the steps of:

a) formulating and initiating the transmission to the SES, by said process, of a command comprising a command object and a data object, b) selecting a message processor to process said command, by a message processor selector within the SES, c) allocating a new data area within the SES by said message processor;

d) copying said data object to said new data area by said message processor; and e) placing an address of said new data area in an associated directory entry in said directory, by said message processor, after said step of copying.

19. A method for performing a command process within a Structured External Storage (SES) processor, said process being initiated by a command transmitted to the SES by a program in a Central Electronic Complex (CEC) attached to the SES, said method comprising the steps of:

a) selecting a message processor within the SES to perform said command process;

b) performing a portion of said command process by said message processor and returning a completion indication to said program, said portion being less than all of said command process; and c) performing a remaining portion of said command process by said message processor and, if said remaining portion results in less than all of said command process being performed, setting a damage indicator in the SES to prevent further access to data within the SES.

20. The method of claim 19 in which said damage indicator is a "facility damage" indicator, and said data comprises all data within the SES.

21. The method of claim 19 in which said damage indicator is a "structure damage" indicator, and said data comprises a single data structure within said SES.

22. The method of claim 19 in which said step of performing a remaining portion of said command process further comprises the step of performing an error recovery process to recover from an error encountered during said performing.

23. A method for performing a command process within a Structured External Storage (SES) processor, said process being initiated by a command transmitted to the SES by a first program in a first Central Electronic Complex (CEC) attached to the SES, said method comprising the steps of:

a) selecting a message processor within the SES to perform said command process;

b) performing a portion of said command process by said message processor and storing checkpoint data for restarting said command at a point of suspension;

c) transmitting said command to said SES by a second program in a second CEC; and d) accessing said checkpoint data by said message processor and continuing said command process from said point of suspension, in response to said command transmitted by said second program.

24. A method for performing a command process within a Structured External Storage (SES) processor, said process being initiated by a first command transmitted to the SES by a program in a Central Electronic Complex (CEC) attached to the SES, said method comprising the steps of:

a) selecting a message processor within the SES to perform said command process;

b) performing a portion of said command process by said message processor and returning to said program a restart token;

c) transmitting to said SES, by said program, a second command comprising said restart token; and d) receiving said restart token by said message processor, and using said restart token as a start position indicator to continue said command process from said point of suspension, in response to said second command.

* * * * *

UNITED STATES PATENT AND TRADEMARK OFFICE
CERTIFICATE OF CORRECTION

PATENT NO.    :  5,317,739
DATED         :  May 31, 1994
INVENTOR(S)   :  David A. Elko, et al.

It is certified that error appears in the above-identified patent and that said Letters Patent is hereby corrected as shown below:

Column 56, line 62, after "said" insert -- vector means --.

Signed and Sealed this

Sixth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,317,739
DATED        : May 31, 1994
INVENTOR(S)  : Elko et al.

It is certified that error appears in the above-indentified patent and that said Letters Patent is hereby corrected as shown below:

On the title page, item [75]
    Inventors:  Change Jeffery M. Mick to Jeffrey M. Nick Signed and Sealed this Twenty-eighth Day of May, 1996

Attest:

BRUCE LEHMAN

*Attesting Officer*     *Commissioner of Patents and Trademarks*